(12) United States Patent
Fan et al.

(10) Patent No.: US 12,457,867 B2
(45) Date of Patent: Oct. 28, 2025

(54) DISPLAY SUBSTRATE AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Cong Fan, Beijing (CN); Kemeng Tong, Beijing (CN); Fan He, Beijing (CN); Xiangdan Dong, Beijing (CN); Yu Wang, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 521 days.

(21) Appl. No.: 17/928,408

(22) PCT Filed: Mar. 17, 2021

(86) PCT No.: PCT/CN2021/081303
§ 371 (c)(1),
(2) Date: Nov. 29, 2022

(87) PCT Pub. No.: WO2022/193172
PCT Pub. Date: Sep. 22, 2022

(65) Prior Publication Data
US 2023/0209925 A1    Jun. 29, 2023

(51) Int. Cl.
*H10K 59/131* (2023.01)
*G06F 3/041* (2006.01)
(Continued)

(52) U.S. Cl.
CPC ......... *H10K 59/131* (2023.02); *G06F 3/0412* (2013.01); *G09G 3/3233* (2013.01);
(Continued)

(58) Field of Classification Search
None
See application file for complete search history.

(56) References Cited

U.S. PATENT DOCUMENTS

| 10,923,549 | B2 * | 2/2021 | Lee | ...... H01L 23/585 |
| 2011/0221700 | A1 | 9/2011 | Mo et al. | |
| 2011/0273435 | A1 | 11/2011 | Umezaki et al. | |

FOREIGN PATENT DOCUMENTS

| CN | 101882040 A | 11/2010 |
| CN | 109841181 A | 6/2019 |

(Continued)

OTHER PUBLICATIONS

International Search Report in PCT/CN2021/081303 dated Dec. 15, 2021 with English translation.
(Continued)

*Primary Examiner* — Kyoung Lee
(74) *Attorney, Agent, or Firm* — Collard & Roe, P.C.

(57) ABSTRACT

A display substrate and a display device are provided. The display substrate includes a base substrate, a plurality of signal lines, a first power line, at least one first detection signal line and at least one second detection signal line. At a side close to a bending area and outside an area where an orthographic projection of the first power line on a substrate surface of the base substrate, orthographic projections of the at least one first detection signal line and the at least one second detection signal line on the substrate surface of the base substrate have no overlap with orthographic projections of the plurality of signal lines on the substrate surface of the base substrate. The display substrate can improve the anti-static capability of the second detection signal line and improve the product yield.

20 Claims, 6 Drawing Sheets

(51) Int. Cl.
  *G09G 3/3233* (2016.01)
  *H10K 59/40* (2023.01)
  *H10K 59/80* (2023.01)
  *H10K 77/10* (2023.01)
  *H10K 102/00* (2023.01)

(52) U.S. Cl.
  CPC ........... *H10K 59/40* (2023.02); *H10K 59/873* (2023.02); *H10K 77/111* (2023.02); *G09G 2300/0426* (2013.01); *G09G 2300/0842* (2013.01); *G09G 2310/0286* (2013.01); *H10K 2102/311* (2023.02)

(56) References Cited

FOREIGN PATENT DOCUMENTS

| | | |
|---|---|---|
| CN | 110061035 A | 7/2019 |
| CN | 110993659 A | 4/2020 |
| CN | 111326527 A | 6/2020 |
| CN | 111833786 A | 10/2020 |
| JP | H09-243995 A | 9/1997 |

OTHER PUBLICATIONS

Written Opinion in PCT/CN2021/081303 dated Dec. 15, 2021 in Chinese.
Written Opinion in PCT/CN2021/081303 dated Dec. 15, 2021 in English.

* cited by examiner

DISPLAY SUBSTRATE AND DISPLAY DEVICE

CROSS REFERENCE TO RELATED APPLICATIONS

This application is the National Stage of PCT/CN2021/081303 filed on Mar. 17, 2021, the disclosure of which is incorporated by reference.

TECHNICAL FIELD

Embodiments of the present disclosure relate to a display substrate and a display device.

BACKGROUND

In the display industry, with the rapid development and application of flexible OLED (Organic Light-Emitting Diode) display technology and AMOLED (Active-Matrix Organic Light-Emitting Diode) display technology, how to reduce the manufacturing cost of existing flexible products and improve the yield of flexible products has become one of the key issues to be solved. In order to reduce the manufacturing cost of existing flexible display screens and to improve the product yield and production quality control in a better way, PCD (crack detection) detection signals can be introduced into a display panel, which can effectively detect a circuit crack and other defected problems occurred on a backplane circuit of the display panel.

SUMMARY

At least one embodiment of the present disclosure provides a display substrate including a base substrate, a plurality of signal lines, a first power line, at least one first detection signal line and at least one second detection signal line. The base substrate includes a display area and a peripheral area surrounding the display area, wherein the display area includes a pixel array including a plurality of sub-pixels, and wherein the peripheral area includes a bending area located at a first side of the display area and a shift register located at at least one of a second side or a third side of the display area, the first side is adjacent to the second side and the third side; wherein one end of each of the plurality of signal lines is led out from the bending area, and the other end of each of the plurality of signal lines is connected with the shift register. The first power line is led out from the bending area and routed around the display area. The at least one first detection signal line is arranged at at least one of a side where the shift register is located or a fourth side opposite to the first side of the display area, wherein a first end of the at least one first detection signal line is led out from the bending area. The at least one second detection signal line is arranged at at least one of the side where the shift register is located or the fourth side, wherein a first end of the at least one second detection signal line is led out from the bending area, wherein at a side close to the bending area and outside an area where an orthographic projection of the first power line on a substrate surface of the base substrate is located, an orthographic projection of the at least one first detection signal line and an orthographic projection of the at least one second detection signal line on the substrate surface of the base substrate have no overlap with orthographic projections of the plurality of signal lines on the substrate surface of the base substrate.

For example, in the display substrate provided by at least one embodiment of the present disclosure, at the first side of the display area, in the area where the orthographic projection of the first power line on the substrate surface of the base substrate is located, the orthographic projection of the at least one second detection signal line on the substrate surface of the base substrate overlaps with the orthographic projections of the plurality of signal lines on the substrate surface of the base substrate.

For example, in the display substrate provided by at least one embodiment of the present disclosure, an area where the orthographic projection of the at least one second detection signal line on the substrate surface of the base substrate overlaps with the orthographic projections of the plurality of signal lines on the substrate surface of the base substrate is completely covered by the area where the orthographic projection of the first power line on the substrate surface of the base substrate is located.

For example, in the display substrate provided by at least one embodiment of the present disclosure, at the first side of the display area, a second end of the at least one first detection signal line is connected in series with a second end of the at least one second detection signal line.

For example, in the display substrate provided by at least one embodiment of the present disclosure, at the first side of the display area and in a direction perpendicular to the substrate surface of the base substrate, at least part of a film layer where the first power line is located is located between a film layer where the at least one second detection signal line is located and a film layer where the plurality of signal lines are located.

For example, in the display substrate provided by at least one embodiment of the present disclosure, at the side close to the bending area and outside the area where the orthographic projection of the first power line on the substrate surface of the base substrate is located, the plurality of signal lines are routed in parallel; at least some of line segments of the at least one first detection signal line and at least some of line segments of the at least one second detection signal line are routed in parallel to the plurality of signal lines; and the at least one second detection signal line is located at a side of the at least one first detection signal line away from the plurality of signal lines.

For example, in the display substrate provided by at least one embodiment of the present disclosure, at the first side of the display area, the at least one second detection signal line includes a plurality of first line segments respectively connected to the first end and a second end of the at least one second detection signal line, and the plurality of first line segments extend along a first direction; in the area where the orthographic projection of the first power line on the substrate surface of the base substrate is located, orthographic projections of the plurality of first line segments on the substrate surface of the base substrate overlap with the orthographic projections of the plurality of signal lines on the substrate surface of the base substrate.

For example, in the display substrate provided by at least one embodiment of the present disclosure, an area where the orthographic projections of the plurality of first line segments on the substrate surface of the base substrate overlap with the orthographic projections of the plurality of signal lines on the substrate surface of the base substrate has a length in the first direction ranging from 220 microns to 260 microns.

For example, in the display substrate provided by at least one embodiment of the present disclosure, at the side close to the bending area and outside the area where the orthographic projection of the first power line on the substrate surface of the base substrate is located, the orthographic projections of the plurality of first line segments on the substrate surface of the base substrate also overlap with the orthographic projection of the at least one first detection signal line on the substrate surface of the base substrate.

For example, in the display substrate provided by at least one embodiment of the present disclosure, the at least one second detection signal line further includes a plurality of second line segments, wherein one of the plurality of first line segments is connected with the first end of the at least one second detection signal line through one of the plurality of second line segments, another one of the plurality of first line segments is connected with the second end of the at least one second detection signal line through another one of the plurality of second line segments, and the plurality of second line segments are located between the plurality of first line segments and the bending area, wherein the plurality of second line segments are routed along a direction intersecting with the first direction; the at least one first detection signal line includes a plurality of third line segments respectively connected with the first end and the second end of the at least one first detection signal line, orthographic projections of the plurality of third line segments on the substrate surface of the base substrate overlap with the orthographic projections of the plurality of first line segments on the substrate surface of the base substrate, and the plurality of third line segments are routed and arranged in parallel with the plurality of second line segments; the plurality of third line segments are located at a side of the plurality of second line segments close to the display area, and are located between the plurality of second line segments and the plurality of signal lines.

For example, in the display substrate provided by at least one embodiment of the present disclosure, in a routing direction perpendicular to the plurality of second line segments and the plurality of third line segments, the plurality of second line segments and the plurality of third line segments are routed in parallel with line segments of the plurality of signal lines corresponding to the second line segments and the third line segments.

For example, in the display substrate provided by at least one embodiment of the present disclosure, the second line segment connected to the first end of the at least one second detection signal line is adjacent to the third line segment connected to the first end of the at least one first detection signal line; and in the routing direction perpendicular to the plurality of second line segments and the plurality of third line segments, an interval width between the second line segment and the third line segment that are adjacent is in the range from 2 microns to 3 microns.

For example, in the display substrate provided by at least one embodiment of the present disclosure, at a side of the bending area close to the display area, a position where the second end of the at least one first detection signal line and the second end of the at least one second detection signal line are connected in series is located between the first end of the at least one second detection signal line and the first end of the at least one first detection signal line; the first end of the at least one first detection signal line is located at a side of the first end of the at least one second detection signal line away from the plurality of signal lines.

For example, in the display substrate provided by at least one embodiment of the present disclosure, the at least one second detection signal line further includes a plurality of first broken line segments parallel to each other, one of the plurality of first broken line segments is connected with one of the plurality of second line segments and the first end of the at least one second detection signal line, another one of the plurality of first broken line segments is connected with another one of the plurality of second line segments and the second end of the at least one second detection signal line; a line width of the plurality of first broken line segments is greater than that of the plurality of second line segments.

For example, in the display substrate provided by at least one embodiment of the present disclosure, at least some line segments of the plurality of first broken line segments are routed in a second direction different from the first direction.

For example, in the display substrate provided by at least one embodiment of the present disclosure, the at least one first detection signal line further includes a plurality of fourth line segments, and the plurality of fourth line segments are routed along the first direction; one of the plurality of third line segments is connected to the first end of the at least one first detection signal line through one of the plurality of fourth line segments, another one of the plurality of third line segments is connected to the second end of the at least one first detection signal line through another one of the plurality of fourth line segments; orthographic projections of the plurality of fourth line segments on the substrate surface of the base substrate respectively overlap with an orthographic projection of at least one of the plurality of first broken line segments on the substrate surface of the base substrate.

For example, in the display substrate provided by at least one embodiment of the present disclosure, the sub-pixel includes a pixel structure including a pixel driving circuit, a first planarization layer, and a light-emitting element; wherein the pixel driving circuit includes a first display area metal layer, a second display area metal layer, a third display area metal layer, a first insulating layer, a second insulating layer, an interlayer insulating layer, the first planarization layer and a pixel defining layer, wherein the first planarization layer is at a side of the pixel driving circuit away from the base substrate to provide a first planarization surface, and the first planarization layer includes a first via hole; the light-emitting element includes a first electrode, a second electrode and a light-emitting layer located between the first electrode and the second electrode, wherein the first electrode is located at a side of the first planarization layer away from the base substrate, the first electrode is electrically connected with the third display area metal layer of the pixel driving circuit through the first via hole, the pixel defining layer is located at a side of the first electrode away from the base substrate, and the pixel defining layer defines a light-emitting area of the light-emitting element; the first insulating layer is located on the base substrate, the first display area metal layer is located at a side of the first insulating layer away from the base substrate, the second insulating layer is located at a side of the first display area metal layer away from the base substrate, the second display area metal layer is located at a side of the second insulating layer away from the base substrate, the interlayer insulating layer is located between the first planarization layer and the second insulating layer, and the third display area metal layer is located at a side of the interlayer insulating layer away from the base substrate; the display substrate further includes an encapsulation layer and a touch metal layer, wherein the encapsulation layer is located at a side of the light-emitting element away from the base substrate, and the touch metal layer is located at a side of the encapsulation layer away from the base substrate; wherein the at least one second detection signal line is arranged at least in the same layer as the touch metal layer, the at least one first detection signal line is arranged at least in the same layer as the second display area metal layer, and the first power line is arranged at least in the same layer as the third display area metal layer.

For example, the display substrate provided by at least one embodiment of the present disclosure further includes a second via hole, a first peripheral insulating layer and a second peripheral insulating layer, wherein the at least one first detection signal line is located at a side of the first peripheral insulating layer close to the base substrate, the second peripheral insulating layer is located at a side of the first peripheral insulating layer away from the base substrate, and the at least one second detection signal line is located at a side of the second peripheral insulating layer away from the base substrate; the first peripheral insulating layer is arranged in the same layer as the interlayer insulating layer, the second peripheral insulating layer is arranged in the same layer as the first planarization layer; the second via hole penetrates through at least the first peripheral insulating layer and the second peripheral insulating layer; the second end of the at least one first detection signal line and the second end of the at least one second detection signal line are connected in series through the second via hole; and in a direction perpendicular to the substrate surface of the base substrate, an insulating layer arranged in the same layer as the pixel defining layer at least is not provided between the second end of the at least one first detection signal line and the second end of the at least one second detection signal line.

For example, in the display substrate provided by at least one embodiment of the present disclosure, at the side of the display substrate where the shift register is located, the at least one first detection signal line and the at least one second detection signal line are located at a side of the shift register away from the display area.

At least one embodiment of the present disclosure provides a display device including the display substrate described in any of the above.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1:
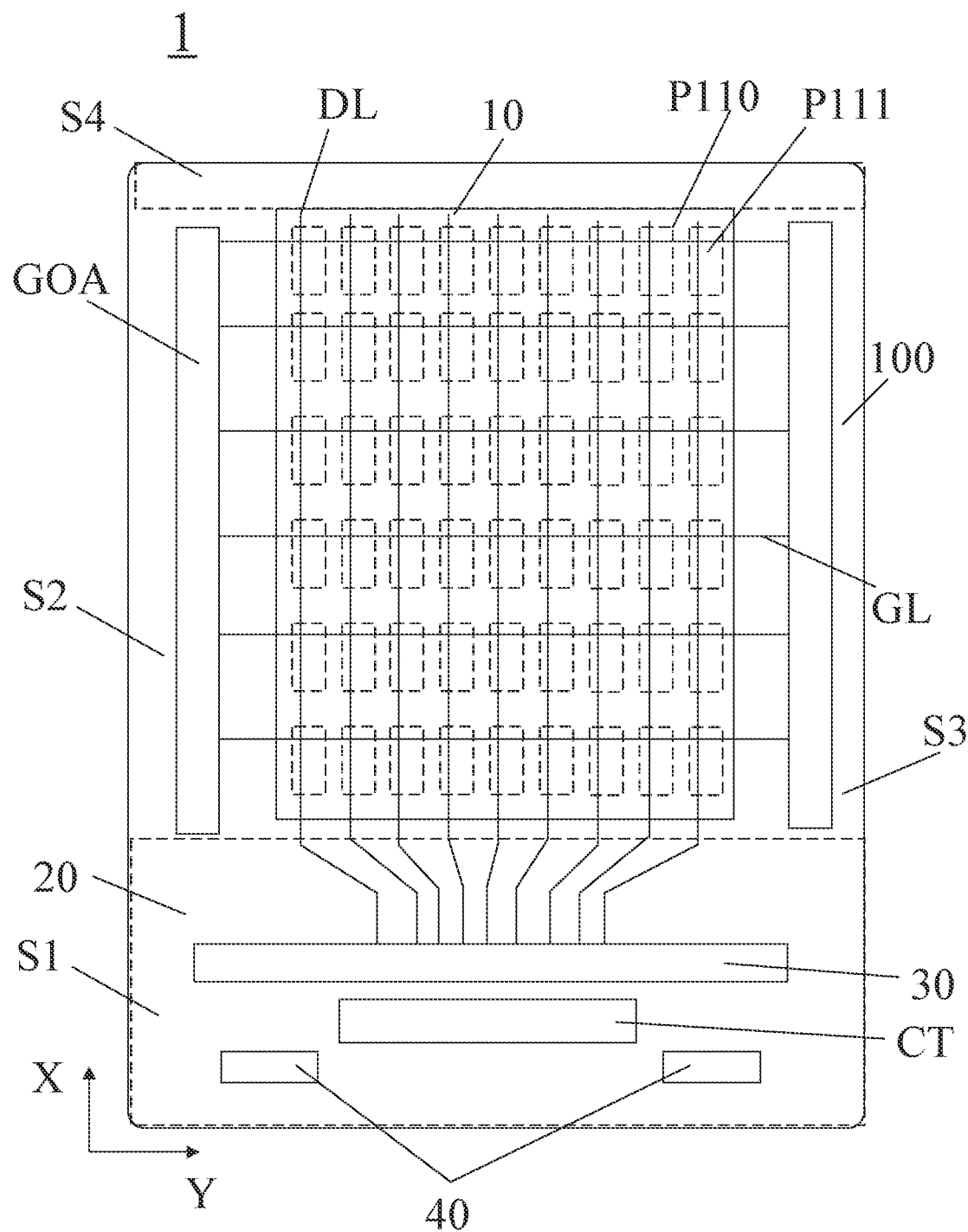
FIG. 1 is a schematic diagram of a display substrate provided by at least one embodiment of the present disclosure.

In order to make objectives, technical details, and advantages of the embodiments of the present disclosure more apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Likewise, the terms "a/an", "one", "the" etc., are not intended to indicate any limitation to the amount but the presence of at least one. The terms "comprise," "comprising," "include," "including," etc., are intended to specify that the elements or the objects stated before these terms encompass the elements or the objects and equivalents thereof listed after these terms. For convenience of description, "up", "down," "front" and "back" are given in part of the drawings. In the embodiments of the present disclosure, an upright direction is an up-down direction, a vertical direction is a direction of gravity, a horizontal direction is a direction perpendicular to the upright direction, and a horizontal direction from right to left is a front-back direction.

The existing FMLOC (Flexible Metal-layer on Cell Touch) panel has become a product with trendy design. Compared with an out-cell touch panel, the FMLOC panel can greatly reduce the cost with higher integration as well as lighter and thinner product. In order to detect cracks occurred in the FMLOC panel product during both the process of a TFT (thin film transistor) layer metal (Display) and the process of a touch metal layer (Touch), it usually detects a PCD signal for a crack occurred in the TFT layer metal and a PCD signal for a crack occurred in the touch metal layer. For example, the PCD signal for detecting the crack occurred in the TFT layer metal and the PCD signal for detecting the crack occurred in the touch metal layer can be connected in series. However, due to the limitation of the bezel space of the display panel, in general, the PCD wiring at the bezel periphery of the display panel (especially the PCD wiring for detecting the touch metal layer that is located at the side of the display panel where the bonding area is arranged and that crosses with the signal lines, for example, at the connection with the GOA (shift register)) and the wiring of signal lines in the display area of the display panel may easily involve the problem of signal interference between the signal lines in the display area of the display panel and the PCD signals of the touch metal layer; such signal interference is caused by lacking of DC signal shielding effect from a cathode, for example, and result in that the PCD wiring for detecting the touch metal layer has poor antistatic capability and the electrostatic injury may be occurred.

For example, the PCD signal for detecting the crack in TFT layer metal and the PCD signal for detecting the touch metal layer can also adopt other ways before the series connection.

Therefore, one of the key problems to be solved urgently in FMLOC technology is how to solve the problem of poor antistatic capability of the PCD wiring for detecting the touch metal layer that is located at the side of the display panel where the bonding area is arranged and that crosses with the signal lines (for example, at the connection with the GOA (shift register)) in FMLOC products, which problem causes the interference between the signals in the display area and the PCD signals of the touch metal layer. The above problem may also considerably reduce the product yield, resulting in problems that the PCD is undetectable.

At least one embodiment of the present disclosure provides a display substrate including a base substrate, a plurality of signal lines, a first power line, at least one first detection signal line and at least one second detection signal line. The base substrate includes a display area and a peripheral area surrounding the display area; the display area includes a pixel array including a plurality of sub-pixels; the peripheral area includes a bending area located at a first side of the display area and a shift register located at at least one of a second side or a third side of the display area, and the first side is adjacent to the second side and adjacent to the third side. One end of each of the plurality of signal lines is led out from the bending area, and the other end of each of the plurality of signal lines is connected with the shift register. The first power line is led out from the bending area and routed around the display area. The at least one first detection signal line is arranged at at least one of the side where the shift register is located or a fourth side opposite to the first side of the display area; a first end of the at least one first detection signal line is led out from the bending area. The at least one second detection signal line is arranged at at least one of the side where the shift register is located or the fourth side; a first end of the at least one second detection signal line is led out from the bending area; at a side close to the bending area and outside an area where an orthographic projection of the first power line on a substrate surface of the base substrate is located, orthographic projections of the at least one first detection signal line and the at least one second detection signal line on the substrate surface of the base substrate have no overlap with orthographic projections of the plurality of signal lines on the substrate surface of the base substrate.

At least one embodiment of the present disclosure also provides a display device including the display substrate described above.

In the display substrate and the display device provided by the above embodiments, the display substrate can improve the antistatic capability of the at least one second detection signal line, especially at the position between the bending area and the display area, and improve the product yield.

The embodiments of the present disclosure and examples thereof will be described in detail below with reference to the drawings.

Figure 2:
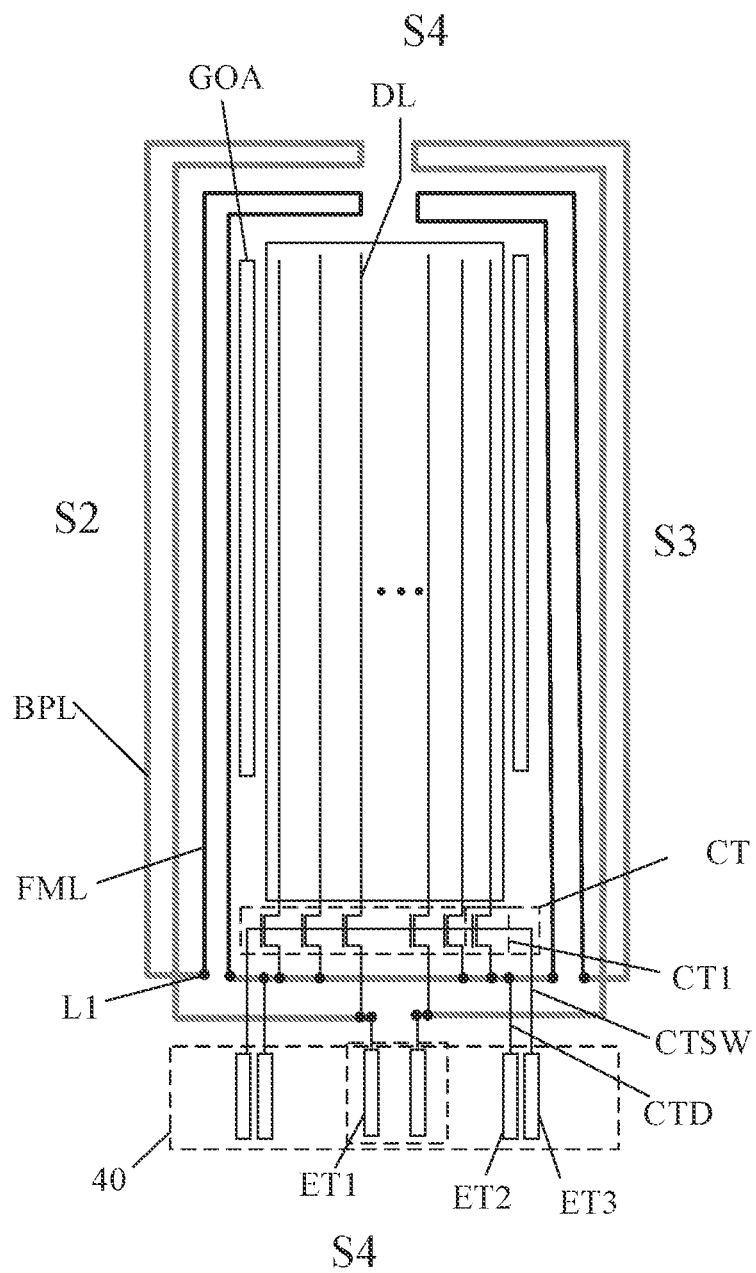
FIG. 2 is a schematic diagram showing the principle of crack detection of a display substrate provided by at least another embodiment of the present disclosure.
Figure 3:
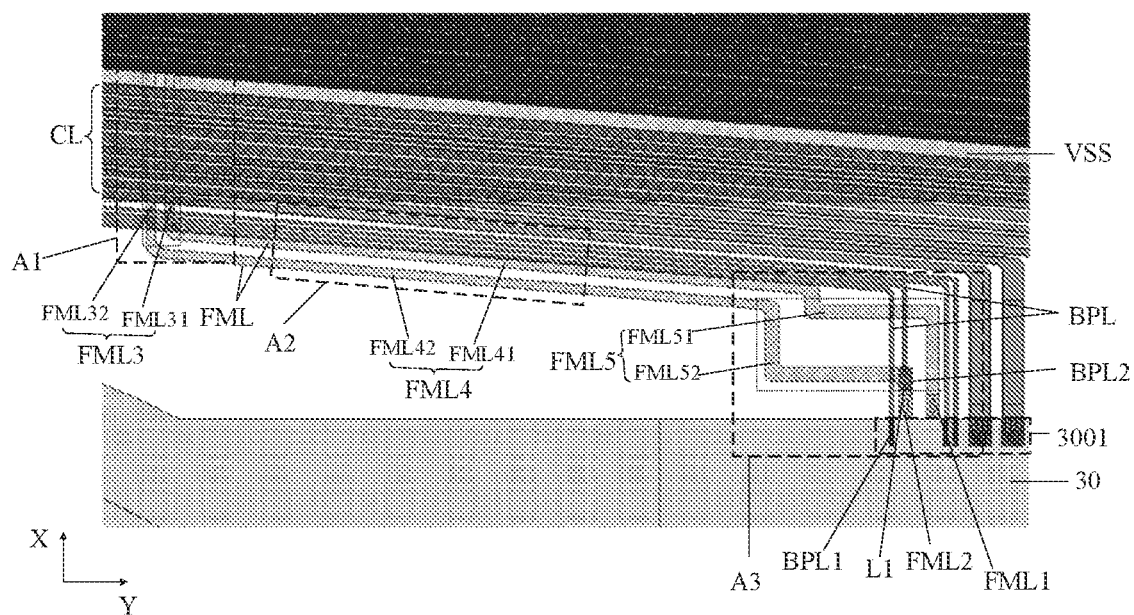
FIG. 3 is a schematic diagram showing a planar layout of part of wirings in a peripheral area of a display substrate provided by at least one embodiment of the present disclosure.

FIG. 1 is a schematic diagram of a display substrate provided by at least one embodiment of the present disclosure. FIG. 2 is a schematic diagram showing the principle of crack detection of a display substrate provided by at least another embodiment of the present disclosure. FIG. 3 is a schematic diagram showing a planar layout of part of wirings in a peripheral area of a display substrate provided by at least one embodiment of the present disclosure.

For example, in some embodiments, as shown in FIG. 1, the display substrate 1 includes a base substrate 100. The base substrate 100 includes a display area 10 and a peripheral area 20. The peripheral area 20 surrounds the display area 10. The peripheral area 20 includes a test circuit CT located at a first side S1 of the display area 10, a bending area 30 and a bonding area 40. In a first direction X, the test circuit CT is located between the bending area 30 and the bonding area 40, that is, the test circuit CT is located at a side of the bending area 30 away from the display area 10. The bonding area 40 includes a plurality of contact pads (as shown in FIG. 2) for bonding with a signal input element, for example, the signal input element includes a data driving circuit (IC). Referring to FIG. 2 in combination with FIG. 1, the test circuit CT includes a plurality of test units CT1. For example, the test unit CT1 is an N-type transistor.

For example, in other embodiments, based on the design requirements of the display substrate 1, at the first side S1 of the display area 10, the bending area 30 can also be designed to be located at a side of the test circuit CT away from the display area 10.

It should be noted that, the test unit CT1 can also be a P-type transistor, and the embodiment of the present disclosure is not limited to this.

As shown in FIG. 1, the display substrate 1 further includes shift registers GOAs located at a second side S2 and a third side S3 of the display area 10. The first side S1 is adjacent to the second side S2 and adjacent to the third side S3. In the embodiment of the present disclosure, the shift registers GOA are provided at both sides of the display area 20, i.e., dual-side driving. According to the circuit configuration requirements of the display substrate 1, single-side driving can also be adopted, and the embodiment of the present disclosure is not limited to this. For example, the display area 10 includes a pixel array P110 including a plurality of sub-pixels P11. The plurality of sub-pixels P111 are arranged in a plurality of rows and columns along the first direction X and the second direction Y in the display area 10. The display substrate 1 further includes a plurality of data lines DL along the first direction X and a plurality of gate lines GL along the second direction Y. The plurality of data lines DL are located in the display area 10 and are electrically connected with a plurality of columns of sub-pixels P111 respectively, that is, each of the plurality of data lines DL is electrically connected with one column of the plurality of sub-pixels P111 (for example, the column direction refers to the first direction X in FIG. 1), and the plurality of data lines DL are configured to provide data signals to a plurality of columns of sub-pixels P111. For example, one end of each of the plurality of data lines DL also extends to the test circuit CT to receive a test data signal. The plurality of gate lines GL pass through the display area 10 in a transverse direction (e.g., in the second direction Y in the figure) and are electrically connected with the shift registers GOAs and the plurality of sub-pixels P111 (arranged in rows along the transverse direction) to provide gate scanning signals and light emission control signals for the sub-pixels P111. For example, the shift register GOA may include a shift register unit that provides a gate scanning signal and a light emission control unit that provides a light emission control signal, which will not be described in details here.

For example, as shown in FIGS. 2 and 3, the display substrate includes a plurality of signal lines CL. One end (located at the first side S1 of the display area) of each of the plurality of signal lines CL is led out from the bending area 30 (not shown in the figure), and the other end (located at the side where the shift register GOA is located) of each of the plurality of signal lines CL is connected to the shift register unit GOA. For example, the plurality of signal lines CL include a first clock signal line GCB, a second clock signal line GCK, a first trigger signal line GSTV, a second power line VGH (for example, providing a high level), a third power line VGL (for example, providing a high level) and an initialization signal line VINT that are connected to the shift register unit, and a third clock signal line ECB, a fourth clock signal line ECK, a fourth trigger signal line ESTV, a fourth power line VGH and a fifth power line (not shown in the figures) that are connected to the light emission control unit. The first clock signal line GCB, the second clock signal line GCK and the first trigger signal line GSTV are configured to provide the shift register unit with a first clock signal, a second clock signal and a first trigger signal, respectively. The initialization signal line VINT is configured to be electrically connected to the plurality of sub-pixels P111 and provide initialization signals to the plurality of sub-pixels P111. For example, the initialization signal line VINT also provides a constant low voltage, which may be a negative voltage or the like. For example, in some examples, the low voltage may be a ground voltage. The third clock signal line ECB, the fourth clock signal line ECK and the fourth trigger signal line ESTV are configured to provide the light emission control unit with a third clock signal, a fourth clock signal and a second trigger signal, respectively.

For example, in some embodiments, as shown in FIGS. 2 and 3, the display substrate 1 further includes a first detection signal line BPL and a second detection signal line FML. The first detection signal line BPL is provided at the side where the shift register GOA is located (for example, the second side S2 and the third side S3 of the display area) and the fourth side S4 opposite to the first side S1 of the display area 10. The first end BPL1 of the first detection signal line BPL is led out from the bending area 30. The second detection signal line FML is provided at the side where the shift register GOA is located (for example, the second side S2 and the third side S3 of the display area) and the fourth side S4. The first end FML1 of the second detection signal line FML is led out from the bending area 30, and the second end BPL2 of the first detection signal line BPL is connected in series with the second end FML2 of the second detection signal line FML at the first side S1 of the display area 10. For example, the position where the second end BPL2 of the first detection signal line BPL is connected in series with the second end FML2 of the second detection signal line FML is illustrated as a position L1 in FIG. 2. In FIG. 2, the first detection signal line BPL and the second detection signal line FML are symmetrically routed at two sides of the display substrate. As shown in FIG. 3, the second detection signal line FML is closer to the bending area 30 than the first detection signal line BPL. For example, the second detection signal line FML is located at a side of the first detection signal line BPL away from the plurality of signal lines CL in the first direction. For example, the bending area 30 may include a plurality of leads 3001 along the first direction X. The first end FML1 of the second detection signal line FML and the first end BPL1 of the first detection signal line BPL are connected to the connecting leads 3001, respectively.

For example, in other embodiments, the second end BPL2 of the first detection signal line BPL and the second end FML2 of the second detection signal line FML may be connected in other ways than series connection, and the embodiment of the present disclosure is not limited to this.

For example, as shown in FIG. 2, in some embodiments, at the side (e.g., the second side S2 and the third side S3 of the display area) of the display substrate 1 where the shift register GOA is located, the first detection signal line BPL and the second detection signal line FML are located at a side of the shift register GOA away from the display area 10, so as to reduce the signal interference between various lines.

For example, as shown in FIG. 2, the first contact pad ET1 of the plurality of contact pads in the bonding area 40 of the display area 10 is electrically connected to the first detection signal line BPL. The second contact pad ET2 of the plurality of contact pads is electrically connected to the first end (the end away from the display area 10) of the test circuit CT through the test connection line CTD; the third contact pad ET3 of the plurality of contact pads is electrically connected to the control end of the test circuit CT through the test control connection line CTSW; and the second end of the test circuit CT is electrically connected to the data line DL. In the test stage of the display substrate, the signal input element provides the test control signal and the test data signal to the test circuit through the second contact pad ET2 and the third contact pad ET3, and lights up the display area 10. The signal input element provides electrical signals to the first detection signal line BPL and the second detection signal line FML through the first contact pad ET1 for crack detection. For example, as shown in FIG. 3, the connecting leads 3001 of the bending area 30 can also be connected with the contact pads of the bonding area 40.

Figure 7:
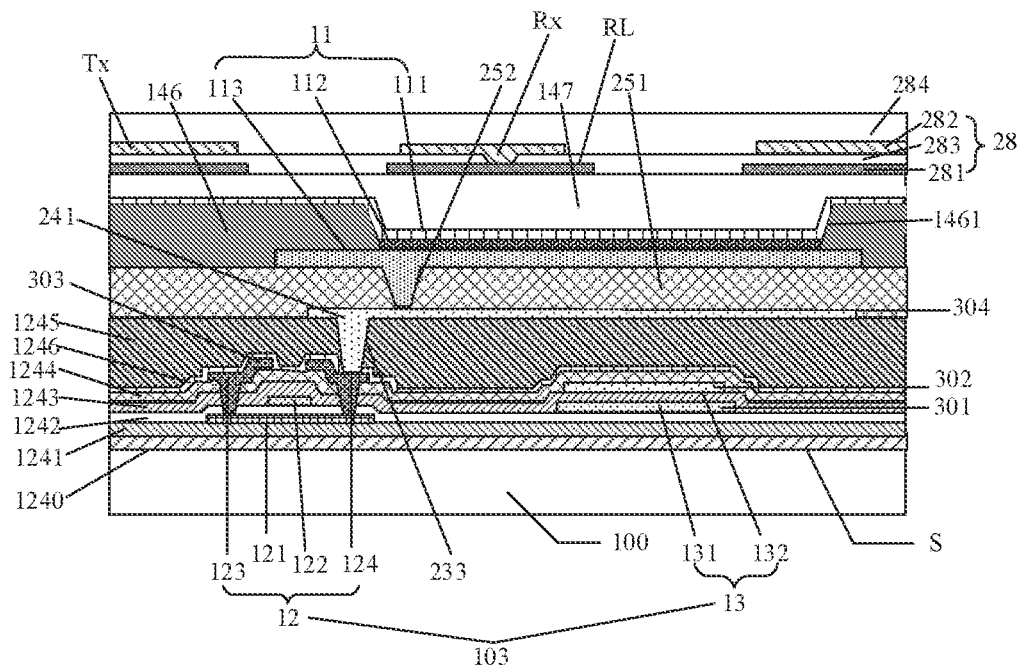
FIG. 7 is a schematic cross-sectional view of a display area of a display substrate provided by at least one embodiment of the present disclosure.

For example, in some embodiments, as shown in FIG. 3, at the first side S1 of the display area 10, in an area where the orthographic projection of the first power line VSS on the substrate surface S of the base substrate 100 (as shown in FIG. 7) is located, the orthographic projection of the second detection signal line FML on the substrate surface S of the base substrate 100 overlaps with the orthographic projections of the plurality of signal lines CL on the substrate surface S of the base substrate 100. That is, the portion where the second detection signal line FML overlaps with the plurality of signal lines CL is also laminated with the first power line VSS. For example, at the side close to the bending area and outside the area where the orthographic projection of the first power line VSS on the substrate surface S of the base substrate 100 is located, the orthographic projections of the first detection signal line BPL and the second detection signal line FML on the substrate surface S of the base substrate 100 have no overlap with the orthographic projections of the plurality of signal lines CL on the substrate surface S of the base substrate 100. That is, in the area where the first power line VSS is not routed, the second detection signal line FML has no overlap with the plurality of signal lines CL. Therefore, it is possible to avoid the poor antistatic capability in the space not provided with the first power line (such poor antistatic capability is caused by the missing of the shielding effect provided by the first power line to the signals (frequency conversion signals) of the plurality of signal lines CL), so as to improve the antistatic capability of the second detection signal line FML and the product yield.

For example, in some embodiments, as shown in FIG. 3, the area where the orthographic projection of the at least one second detection signal line FML on the substrate surface S of the base substrate 100 overlaps with the orthographic projections of the plurality of signal lines CL on the substrate surface S of the base substrate 100 is completely covered by the area where the orthographic projection of the first power line VSS on the substrate surface S of the base substrate 100 is located; that is, in the area outside the orthographic projection of VSS on the substrate surface S of the base substrate 100 in the figure, the second detection signal line FML does not overlap with the plurality of signal lines CL.

For example, in some embodiments, as shown in FIG. 3, at the first side S1 of the display area 10 and in the direction perpendicular to the substrate surface S of the base substrate 100, at least part of the film layer where the first power line VSS is located is located between the film layer where the second detection signal line FML is located and the film layer where the plurality of signal lines CL are located. That is, in the direction perpendicular to the substrate surface S of the base substrate 100, the second detection signal line FML is located at the side of the first power line VSS away from the base substrate 100, and the plurality of signal lines CL are located at the side of the first power line VSS close to the base substrate 100. The second detection signal line FML is designed such that the electrical signal of the first power line VSS completely covers the areas of the plurality of signal lines CL, that is, the area where the second detection signal line FML overlaps with the plurality of signal lines CL is completely covered by the first power line VSS, so that the interference between the second detection signal line FML and the frequency conversion signals of the plurality of signal lines CL is effectively shielded by the DC signal of the first power line VSS. In this way, it avoids the formation of a strong interference electric field in the area where the second detection signal line FML overlaps with the plurality of signal lines CL, thereby effectively relieving the problem of charge accumulation caused by the frequency conversion signals of the plurality of signal lines CL at the position where the second detection signal line FML crosses the plurality of signal lines CL, and greatly improving the antistatic capability of the second detection signal line FML in this area and mitigating the problem of signal interference.

It should be noted that, hereinafter, the film layer where the first power line VSS is located, the film layer where the second detection signal line FML is located, and the film layer where the plurality of signal lines CL are located will be described in details in conjunction with the cross-sectional view of the display area.

For example, in some embodiments, as shown in FIG. 3, at the side close to the bending area and outside the area where the orthographic projection of the first power line VSS on the substrate surface S of the base substrate 100 is located, the plurality of signal lines CL are arranged along substantially the same direction so as not to overlap with each other, for example, these signal lines CL may be routed in parallel, and at least some line segments (for example, some line segments) of the first detection signal line BPL and at least some line segments (for example, some line segments) of the second detection signal line FML are arranged along substantially the same direction as the plurality of signal lines CL so as not to overlap with the signal lines, for example, they are routed in parallel. In the area A2 of FIG. 3, the line segments of the first detection signal line BPL and the line segments of the second detection signal line FML are routed in parallel with the plurality of signal lines CL, and are routed along a direction intersecting with both the first direction X and the second direction Y. The first detection signal line BPL is located between the second detection signal line FML and the plurality of signal lines CL, that is, the first detection signal line BPL is located at the side of the second detection signal line FML away from the plurality of signal lines CL. Therefore, the second detection signal line FML is located outside the plurality of signal lines CL and runs in parallel to the plurality of signal lines CL, so that the problem of poor antistatic capability and the problem of signal interference caused by the frequency conversion signals of the plurality of signal lines CL interfering with the second detection signal line FML in this space can be completely avoided.

For example, the included angle between the first direction X and the second direction Y mentioned in the present disclosure is between 700 and 90°, including 70° and 90°. For example, the included angle between the first direction X and the second direction Y is 70°, 90° or 80°, which can be set according to the actual situation, and the embodiment of the present disclosure is not limited to this. For example, the included angle between the first direction X and the second direction Y may be 75°, 85°, etc.

It should be noted that. "substantially" in the embodiment of the present disclosure means that the two lines are routed in the same direction or in slightly different directions, for example, the included angle (representative of a direction deviation) between the routing directions of the two lines is, for example, smaller than about 10°, or, for example, smaller than about 5°.

Figure 4:
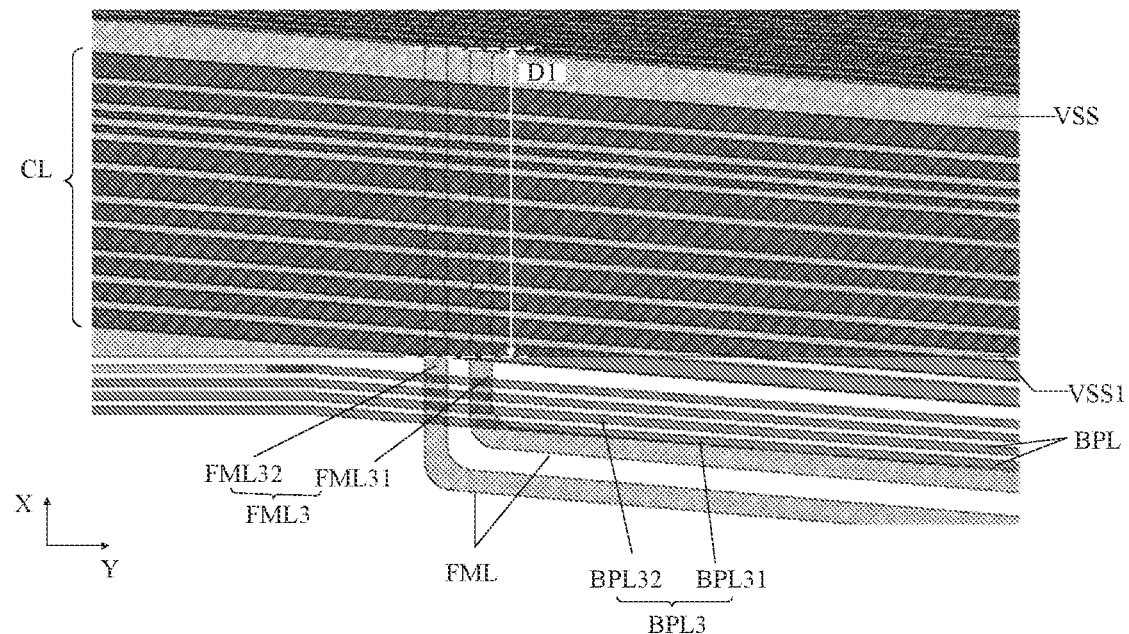
FIG. 4 is an enlarged view of an area A1 in FIG. 3.

FIG. 4 is an enlarged view of the area A1 in FIG. 3.

For example, in some embodiments, as shown in FIGS. 3 and 4, at the first side S1 of the display area 10, the second detection signal line FML includes a plurality of first line segments FML3 connected to the first end FML1 and the second end FM2 of the second detection signal line FML, respectively; and the plurality first line segments FML3 generally extend along the first direction X, for example, the plurality first line segments FML3 can extend completely along the first direction X. For example, the plurality of first line segments FML3 include a first line segment FML31 and a first line segment FML32. The first line segment FML31 is connected to the first end FML1 of the second detection signal line FML; and the first line segment FML32 is connected to the second end FM2 of the second detection signal line FML. In FIG. 3, the first line segment FML31 is located at the right side of the first line segment FML32. In the area where the orthographic projection of the first power line VSS on the substrate surface S of the base substrate 100 is located, the orthographic projections of the plurality of first line segments FML3 on the substrate surface S of the base substrate 100 overlap with the orthographic projections of the plurality of signal lines CL on the substrate surface S of the base substrate 100. That is to say, the first line segment FML3 is laminated with the first power line VSS, and overlaps with the plurality of signal lines CL. In some embodiments, the area where the second detection signal line FML overlaps the plurality of signal lines CL is completely covered by the first power line VSS. In this way, the interference between the second detection signal line FML and the frequency conversion signals of the plurality of signal lines CL is effectively shielded by the DC signal of the first power line VSS. Therefore, it avoids the formation of a strong interference electric field in the area where the second detection signal line FML overlaps with the plurality of signal lines CL, thereby effectively relieving the problem of charge accumulation caused by the frequency conversion signals of the plurality of signal lines CL at the position where the second detection signal line FML crosses the plurality of signal lines CL, and greatly improving the antistatic capability of the second detection signal line FML in this area and mitigating the problem of signal interference.

For example, in some embodiments, as shown in FIG. 4, at the side close to the bending area and outside the area where the orthographic projection of the first power line VSS on the substrate surface S of the base substrate 100 is located, the orthographic projections of the plurality of first line segments FML3 on the substrate surface S of the base substrate 100 also overlap with the orthographic projection of the at least one first detection signal line BPL (for example, the third line segment BPL3) on the substrate surface S of the base substrate 100. Therefore, it is possible to reduce the risk of crack generated when the cutting process is performed on a motherboard on which the display substrate 1 is located.

For example, in other embodiments, as shown in FIG. 4, when the peripheral area 20 of the display substrate 1 has sufficient space, the edge of the first power line VSS close to the first detection signal line BPL may continue to extend to the first detection signal line BPL, so that the orthographic projection of the first power line VSS on the substrate surface S of the base substrate 100 covers an area where the orthographic projections of the plurality of first line segments FML3 on the substrate surface S of the base substrate 100 overlap with the orthographic projection of the first detection signal line BPL (e.g., the third line segment BPL3) on the substrate surface S of the base substrate 100. Therefore, the antistatic capability of the second detection signal line FML can be further improved. For example, in some embodiments, as shown in FIG. 4, the area where the orthographic projections of the plurality of first line segments FML3 on the substrate surface S of the base substrate 100 overlap with the orthographic projections of the plurality of signal lines CL on the substrate surface S of the base substrate 100 has a length D1, in the first direction X, in the range from about 220 microns to about 260 microns. In this way, the interference between the second detection signal line FML and the frequency conversion signals of the plurality of signal lines CL is effectively shielded by the DC signal of the first power line VSS.

Figure 5:
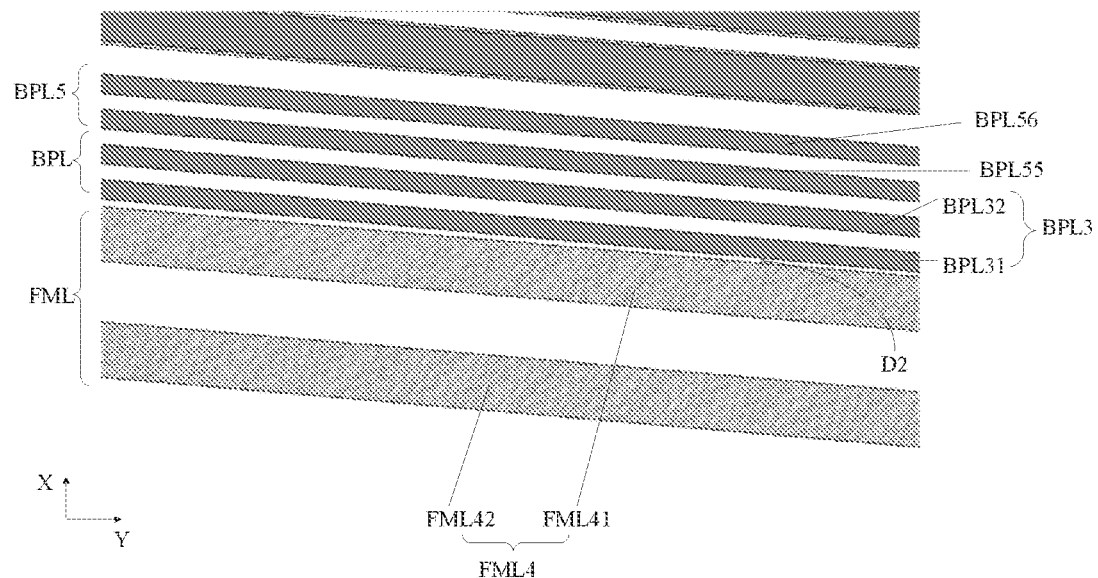
FIG. 5 is an enlarged view of an area A2 in FIG. 3.

FIG. 5 is an enlarged view of an area A2 in FIG. 3.

For example, in some embodiments, as shown in FIGS. 3 and 5, the second detection signal line FML further includes a plurality of second line segments FML4. For example, the plurality of second line segments FML4 are routed along a direction intersecting with the first direction X, such as a direction that is not parallel to both the first direction X and the second direction Y. For example, the routing direction of the plurality of second line segments FML4 is parallel (e.g., approximately parallel) to the routing direction of the plurality of signal lines CL. For example, the plurality of second line segments FML4 include a second line segment FML41 and a second line segment FML42, and the second line segment FML41 is located at the side of the second line segment FML42 close to the plurality of signal lines CL. One of the plurality of first line segments FML3 (for example, the first line segment FML31) is connected to the first end FML1 of the second detection signal line FML through one of the plurality of second line segments FML4 (for example, the second line segment FML41). Another one of the plurality of first line segments FML3 (for example, the first line segment FML31) is connected to the second end FML2 of the second detection signal line FML through another one of the plurality of second line segments FML4 (for example, the second line segment FML42). The plurality of second line segments FML4 are located between the plurality of first line segments FML3 and the bending area 30. The junction between the FML3 and the FML4 can have a gentle or smooth transition, for example, it can have a certain angle but the angle can be designed as a circular arc or a chamfer. In some embodiments, the angle may be about 90°. The word "about" means that it's not strictly defined but can include other angles to achieve a gentle or smooth transition.

For example, the plurality of first line segments FML3 may not be parallel to the first direction X, for example, they may intersect with the first direction X at a certain angle. For example, the angle is smaller than or equal to about 20°.

It should be noted that, in the embodiment of the present disclosure, the word "about" means that it may be fluctuated within the range of, for example, ±15% or ±5% of its value.

For example, in some embodiments, as shown in FIGS. 3 and 5, the first detection signal line BPL includes a plurality of third line segments BPL3 connected to the first end BPL1 and the second end BPL2 of the first detection signal line BPL, respectively. For example, the plurality of third line segments BPL3 are routed along a direction intersected with the first direction X, such as a direction that is not parallel to both the first direction X and the second direction Y. For example, the routing direction of the plurality of third line segments BPL3 is parallel (e.g., approximately parallel) to the routing direction of the plurality of signal lines CL. For example, the plurality of third line segments BPL3 include a third line segment BPL31 and a third line segment BPL32, and the third line segment BPL31 is located at the side of the third line segment BPL32 away from the plurality of signal lines CL. For example, the third line segment BPL31 is adjacent to the second line segment FML41. For example, the orthographic projections of the plurality of third line segments BPL3 on the substrate surface S of the base substrate 100 overlap with the orthographic projections of the plurality of first line segments FML3 on the substrate surface S of the base substrate 100; and the plurality of third line segments BPL3 are routed and arranged in parallel (for example, approximately parallel) to the plurality of second line segments FML4. That is to say, in FIG. 3, the second line segment FML4 not only intersects with the plurality of signal lines CL, but also intersects with the plurality of third line segments BPL3 at the side close the bending area 30 and outside the area of the first power line VSS. The plurality of third line segments BPL3 are located at the side of the plurality of second line segments FML4 close to the display area 10, and are located between the plurality of second line segments FML4 and the plurality of signal lines CL. Therefore, the interference between the second detection signal line FML and the frequency conversion signals of the plurality of signal lines CL is effectively shielded by the DC signal of the first power line VSS, and meanwhile the wiring space can be reduced.

For example, in some embodiments, as shown in FIG. 5, in a routing direction perpendicular to the plurality of second line segments FML4 and the plurality of third line segments BPL3, the plurality of second line segments FML4 and the plurality of third line segments BPL3 are routed in parallel (e.g., approximately parallel) with line segments of the plurality of signal lines CL corresponding to the second line segments FML4 and the third line segments BPL3. Therefore, the signal interference of the plurality of signal lines CL to the first detection signal line BPL and the second detection signal line FML can be reduced, and the wiring space can also be reduced.

For example, in some embodiments, as shown in FIG. 5, the second line segment FML41 connected to the first end FML1 of the second detection signal line FML is adjacent to the third line segment BPL31 connected to the first end BPL1 of the first detection signal line BPL. In a routing direction perpendicular to (for example, approximately perpendicular to) the plurality of second line segments FML4 and the plurality of third line segments BPL3, the interval width D2 between the second line segment FML41 and the third line segment BPL31 that are adjacent is valued in the range from about 2 microns to 3 microns, so that the distance between the first detection signal line BPL and the second detection signal line FML can be made smaller and the wiring space can be reduced.

For example, in some embodiments, as shown in FIG. 3, at the side of the bending area 30 close to the display area 10, the position L1 where the second end BPL2 of the first detection signal line BPL and the second end FML2 of the second detection signal line FML are connected in series is located between the first end FML1 of the second detection signal line FML and the first end BPL1 of the first detection signal line BPL. The first end BPL1 of the first detection signal line BPL is located at the side of the first end FML1 of the second detection signal line FML away from the plurality of signal lines CL. Therefore, the wiring space can be reduced.

Figure 6:
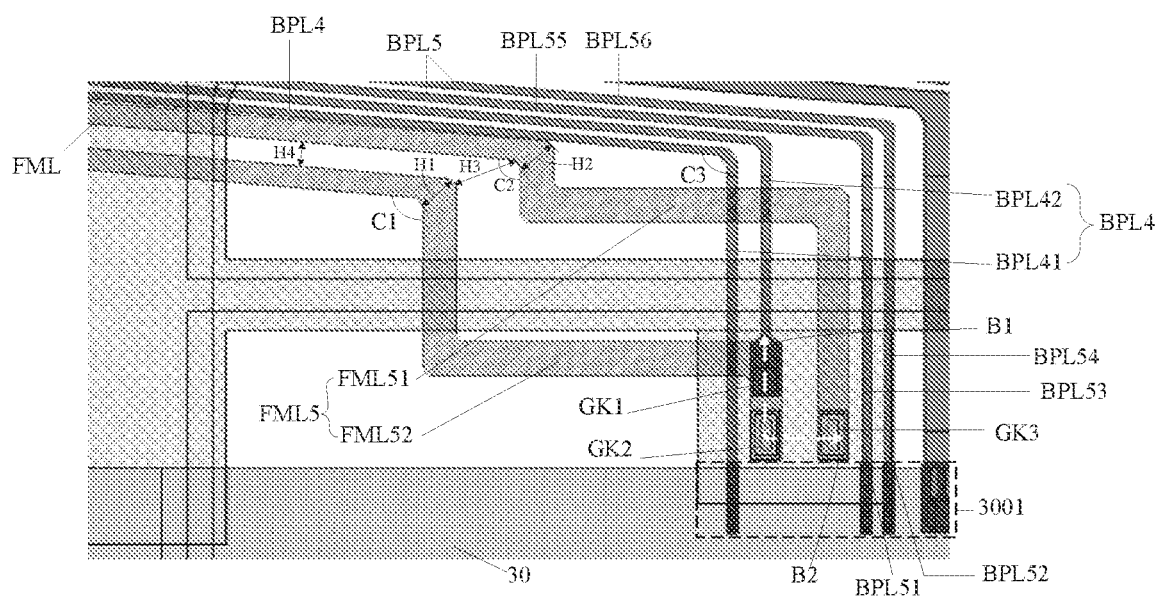
FIG. 6 is an enlarged view of an area A3 in FIG. 3.

FIG. 6 is an enlarged view of an area A3 in FIG. 3.

For example, in some embodiments, as shown in FIGS. 3 and 6, the second detection signal line FML further includes a plurality of first broken line segments FML5 which have approximately the same layout outline, for example, they may be arranged in parallel. For example, the plurality of first broken line segments FML5 are bent and routed along the first direction X and the second direction Y. For example, the plurality of first broken line segments FML5 include a first broken line segment FML51 and a first broken line segment FML52. The first broken line segment FML51 connects the first end FML1 of the second detection signal line FML and the second line segment FML41. The first broken line segment FML52 connects the second end FML2 of the second detection signal line FML and the second line segment FML42. One of the plurality of first broken line segments FML5, such as the first broken line segment FML51, is connected to one of the plurality of second line segments FML4, such as the second line segment FML41, and the first end FML1 of the second detection signal line FML. Another one of the plurality of first broken line segments FML5 (for example, the first broken line segment FML52) is connected to another one of the plurality of second line segments FML4 (for example, the second line segment FML42) and the second end FML1 of the second detection signal line FML. The line width of the plurality of first broken line segments FML5 is larger than the line width of the plurality of second line segments FML4. For example, in a routing direction perpendicular to the plurality of second line segments FML4 (the second line segment FML41 or the second line segment FML42), the line width of the second line segment FML4 is about 15-20 microns. For example, in the direction perpendicular to the routing direction of the plurality of first broken line segments FML5 (the first broken line segment FML51 or the first broken line segment FML52), the line width of the first broken line segment FML5 is about 25-30 microns. Therefore, the antistatic capability of the second detection signal line FML can be improved.

For example, in some embodiments, as shown in FIG. 6, at least some of the first broken line segments FML5 are routed along the second direction Y. As shown in the figure, the first broken line segment FML52 extends from the second end close to the second detection signal line FML along the second direction Y (for example, approximately parallel to the second direction Y) firstly, and then extends along the first direction X (for example, approximately parallel to the first direction X), so as to be connected with the second line segment FML4. The first broken line segment FML51 extends from the second end close to the second detection signal line FML along the first direction X firstly, and then extends along the second direction Y, and then extends along the first direction X, so as to be connected with the second line segment FML4.

For example, some segments (extending along the first direction X) of the plurality of first broken line segments FML5 may be routed in a direction not parallel to the first direction X, for example, it may be intersected with the first direction X at a certain angle. For example, this angle is smaller than or equal to about 20°. Some segments (extending along the second direction Y) of the plurality of first broken line segments FML5 may be routed in a direction not parallel to the second direction Y, for example, it may be intersected with the second direction Y at a certain angle. For example, this angle is smaller than or equal to about 20°.

For example, in some embodiments, as shown in FIG. 6, the first detection signal line BPL further includes a plurality of fourth line segments BPL4. The plurality of fourth line segments BPL4 are routed along the first direction X, for example, the routing direction of the fourth line segments BPL4 is approximately parallel to the first direction X. For example, the plurality of fourth line segments BPL4 include a fourth line segment BPL41 and a fourth line segment BPL42. The fourth line segment BPL41 is located at the side of the fourth line segment BPL42 away from the plurality of signal lines CL. One of the plurality of third line segments BPL3 (for example, the third line segment BPL31) is connected to the first end BPL1 of the first detection signal line BPL through one of the plurality of fourth line segments BPL4 (for example, the fourth line segment BPL41). Another one of the plurality of third line segments BPL3 (for example, the third line segment BPL31) is connected to the second end BPL2 of the first detection signal line BPL through another one of the plurality of fourth line segments BPL4 (for example, the fourth line segment BPL42). The orthographic projections of the plurality of fourth line segments BPL4 on the substrate surface S of the base substrate 100 respectively overlap with the orthographic projection of at least one of the plurality of first broken line segments FML5 on the substrate surface S of the base substrate 100. Specifically, the orthographic projection of the fourth line segment BPL41 on the substrate surface S of the base substrate 100 overlaps with both of the orthographic projections of the first broken line segment FML51 and the first broken line segment FML52 on the substrate surface S of the base substrate 100. The orthographic projection of the fourth line segment BPL42 on the substrate surface S of the base substrate 100 overlaps with the orthographic projection of the first broken line segment FML51 on the substrate surface S of the base substrate 100. Therefore, the wiring space can be reduced without affecting the antistatic capability of the second detection signal line FML.

For example, the plurality of fourth line segments BPL4 may not be parallel to the first direction X, for example, it may be intersected with the first direction X at a certain angle. For example, this angle is smaller than or equal to about 20°.

For example, as shown in FIGS. 3 and 6, the second end BPL2 of the first detection signal line BPL and the second end FML2 of the first detection signal line FML are connected through the second via hole GK1. The second end BPL2 of the first detection signal line BPL can also be connected to the connecting lead 3001 of the bending area 30 through the third via hole GK2, and the first end BPL1 of the first detection signal line BPL can also be connected to the connecting lead 3001 of the bending area 30 through the fourth via hole GK3.

Figure 8:
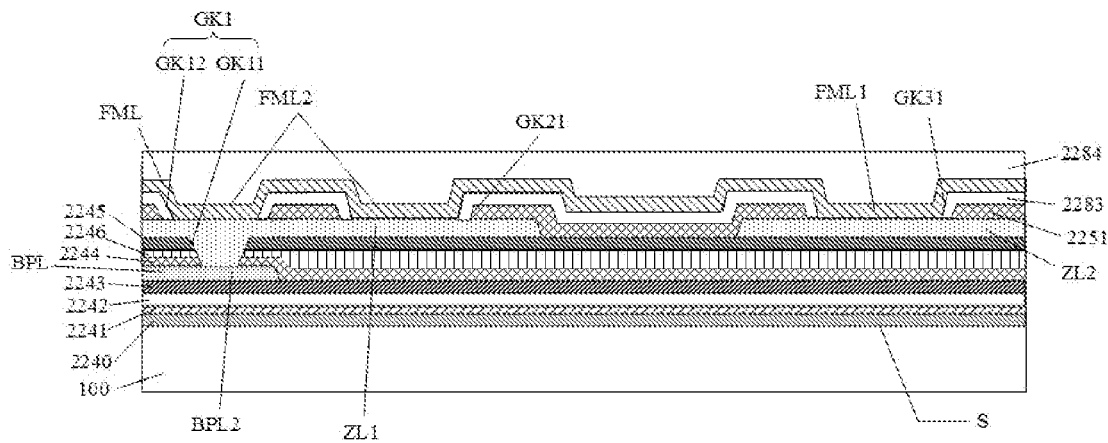
FIG. 8 is a schematic cross-sectional view along line B1-B2 in FIG. 6.

FIG. 7 is a schematic cross-sectional view of a display area of a display substrate provided by at least one embodiment of the present disclosure. FIG. 8 is a schematic cross-sectional view along the line B1-B2 in FIG. 6.

For example, in some examples, as shown in FIG. 7, each of the plurality of sub-pixels P111 includes a pixel structure including a pixel driving circuit 103. The pixel driving circuit 103 includes a first display area metal layer 301, a second display area metal layer 302 and a third display area metal layer 303. The first display area metal layer 301 is located on the base substrate 100, that is, located between a first insulating layer 1242 (i.e., a first gate insulating layer) and a second insulating layer 1243 (i.e., a second gate insulating layer). The second display area metal layer 302 is located at the side of the first display area metal layer 301 away from the base substrate 100, that is, located between the second insulating layer 1243 and an interlayer insulating layer 1244. The third display area metal layer 303 is located at the side of the second display area metal layer 302 away from the base substrate 100, that is, located at the side of the interlayer insulating layer 1244 away from the base substrate 100.

For example, the base substrate 100 may be a glass plate, a quartz plate, a metal plate or a resin plate, etc. For example, the material of the base substrate may include organic materials, such as polyimide, polycarbonate, polyacrylate, polyetherimide, polyethersulfone, polyethylene terephthalate and polyethylene naphthalate. For example, the base substrate 100 may be a flexible substrate or a non-flexible substrate, and the embodiment of the present disclosure is not limited to this.

For example, as shown in FIG. 7, the pixel driving circuit 103 further includes a plurality of transistors and capacitors. The plurality of transistors may include a transistor directly electrically connected to a light-emitting device, such as a switching transistor (e.g., light emission control transistor) or a driving transistor. The plurality of capacitors may include a storage capacitor (so as to store a data signal as written). In one embodiment, the pixel driving circuit 103 includes a driving transistor 12 and a storage capacitor 13. The driving transistor 12 includes a gate electrode 122, a source electrode 123, a drain electrode 124, and an active layer 121. The display substrate 1 further includes a barrier layer 1240, a buffer layer 1241, a first insulating layer 1242, a second insulating layer 1243, and an interlayer insulating layer 1244. The storage capacitor 13 includes a first electrode plate 131 and a second electrode plate 132. The first electrode plate 131 and the second electrode plate 132 are opposite to each other and stacked with each other. The barrier layer 1240 is located on the base substrate 100, and the buffer layer 1241 is located at the side of the barrier layer 1240 away from the base substrate 100. The buffer layer 1241 serves as a transition layer, which can not only prevent harmful substances in the base substrate from intruding into the display substrate, but also increase the adhesion of film layers in the display substrate onto the base substrate 100. The barrier layer 1240 can provide a flat surface for forming the pixel driving circuit 103, and can prevent impurities possibly existed in the base substrate 100 from diffusing into a sub-pixel driving circuit or the pixel driving circuit 103 and adversely affecting the performance of the display substrate.

For example, the material of the buffer layer 1241 may include insulating materials such as silicon oxide, silicon nitride and silicon oxynitride. The material of one or more of the first insulating layer 1242, the second insulating layer 1243 and the interlayer insulating layer 1244 may include insulating materials such as silicon oxide, silicon nitride, and silicon oxynitride. The materials of the first insulating layer 1242, the second insulating layer 1243 and the interlayer insulating layer 1244 may be the same or different.

For example, the material of the barrier layer 1240 may include inorganic insulating materials such as silicon oxide, silicon nitride, silicon oxynitride, or other suitable materials.

For example, as shown in FIG. 7, the active layer 121 is arranged on the base substrate 100, and located at the side of the buffer layer 1241 away from the base substrate 100. The first insulating layer 1242 is located at the side of the active layer 121 away from the base substrate 100; and the gate electrode 122 and the first electrode plate 131 are arranged in the same layer at the side of the first insulating layer 1242 away from the base substrate 100. The second insulating layer 1243 is located at the side of the gate electrode 122 and the first electrode plate 131 away from the base substrate 100. The second electrode plate 132 is arranged at the side of the second insulating layer 1243 in the display area away from the base substrate 100. The interlayer insulating layer 1244 is located at the side of the second electrode plate 132 away from the base substrate 100. The source electrode 123 and the drain electrode 124 are arranged at the side of the interlayer insulating layer 1244 away from the base substrate 100, and are electrically connected with the active layer 121 through the via holes in the first insulating layer 1242, the second insulating layer 1243 and the interlayer insulating layer 1244. The gate electrode 122 and the first electrode plate 131 are located in the first display area metal layer 301; the second electrode plate 132 is located in the second display area metal layer 302; and the source electrode 123 and the drain electrode 124 are located in the third display area metal layer 303.

For example, the material of the active layer 121 may include polysilicon or oxide semiconductor (for example, indium gallium zinc oxide (IGZO)). The material of the gate electrode 122 may include a metal material or an alloy material, such as a single-layered metal structure or multi-layered metal structure formed by molybdenum, aluminum and titanium; for example, the multi-layered structure is a multi-layered metal lamination (such as a three-layered metal lamination of titanium, aluminum and titanium (Ti/Al/Ti)). The materials of the source electrode 123 and the drain electrode 124 may include metal materials or alloy materials, such as a single-layered or multi-layered metal structure formed by molybdenum, aluminum, titanium and the like; for example, the multi-layered structure is a multi-layered metal lamination (such as a three-layered metal lamination of titanium, aluminum and titanium (Ti/Al/Ti)). The embodiment of the present disclosure is not intended to specifically limit the materials of various functional layers. For example, the material of the second electrode plate 132 may include a metal material or an alloy material, such as a single-layered or multi-layered metal structure formed by molybdenum, aluminum, titanium, and the like; for example, the multi-layered structure is a multi-layered metal lamination (such as a three-layered metal lamination of titanium, aluminum and titanium (Ti/Al/Ti)).

For example, as shown in FIG. 7, the display substrate 1 further includes a first planarization layer 1245. The first planarization layer 1245 is located at the side of the source electrode 123 and the drain electrode 124 (that is, the pixel driving circuit 103) away from the base substrate 100, so as to provide a first planarization surface to planarize the surface of the pixel driving circuit 103 away from the base substrate 100. The first planarization layer 1245 includes a first via hole 233 through which the pixel driving circuit 103 (e.g., the third display area metal layer 303) is electrically connected to the light-emitting device (e.g., through a first transition electrode 241).

As shown in FIG. 7, the display substrate 1 further includes a first transition electrode 241 and a second planarization layer 251 located in the fourth display area metal layer 304. The first transition electrode 241 is arranged at the side of the first planarization layer 1245 away from the base substrate 100. The first transition electrode 241 is electrically connected to the drain electrode 124 (or the source electrode 123) through the first via hole 233. The first transition electrode 241 can avoid directly forming a through via hole with a larger aperture in the first planarization layer 232, thereby improving the quality of electrical connection of the via holes. At the same time, the first transition electrode 241 can also be formed in the same layer as other signal lines, so it will not increase the number of process steps.

For example, the materials of the first planarization layer 1245 and the second planarization layer 251 include inorganic insulating materials such as silicon oxide, silicon nitride and silicon oxynitride, and may also include organic insulating materials such as polyimide, polyamide, acrylic resin, benzocyclobutene or phenolic resin. The embodiments of the present disclosure are not limited to this.

For example, the material of the first transition electrode 241 may include a metal material or an alloy material, such as a single-layered or multi-layered metal structure formed by molybdenum, aluminum, titanium and the like.

For example, as shown in FIG. 7, the display substrate 1 further includes a passivation layer 1246 located between the pixel driving circuit 106 and the first planarization layer 1245. At this time, the first via hole 233 also penetrates through the passivation layer 1246. The passivation layer 1246 can protect the source electrode 123 and the drain electrode 124 of the pixel driving circuit 103 from being corroded by water vapor. The pixel driving circuit 103 and the first transition electrode 241 are electrically connected through the first via hole 233.

For example, the material of the passivation layer 1246 may include an organic insulating material or an inorganic insulating material, such as silicon nitride, which can protect the pixel driving circuit 103 from being corroded by water vapor because of its high dielectric constant and good hydrophobic function.

For example, as shown in FIG. 7, the second planarization layer 251 is arranged at the side of the first transition electrode 241 away from the base substrate 100, so as to provide a planarization surface at the side of the first transition electrode 241 away from the base substrate 100. Furthermore, a via hole 252 is formed in the second planarization layer 251 to expose the first transition electrode 241.

For example, as shown in FIG. 7, the display substrate 1 further includes a pixel defining layer 146 and a light-emitting element 11. The light-emitting element 11 is arranged at the side of the second planarization layer 251 away from the base substrate 100. The light-emitting element 11 includes a first electrode 113 (for example, an anode), a light-emitting layer 112, and a second electrode 111 (for example, a cathode). The first electrode 113 is located at the side of the first planarization layer 1245 away from the base substrate 100, and is connected to the first transition electrode 241 through the via hole 252 of the second planarization layer 251 so as to be electrically connected with the pixel driving circuit 103 (e.g., the drain electrode 124 of the driving transistor 12). The second electrode 111 is located at the side of the pixel defining layer 146 away from the base substrate 100. The pixel defining layer 146 is located at the side of the first electrode 113 away from the base substrate 14, and includes a first pixel opening 1461. The first pixel opening 1461 is provided corresponding to the light-emitting element 11. The light-emitting layer 112 is located in the first pixel opening 1461, and is located between the first electrode 113 and the second electrode 111. The part of the light-emitting layer 112 that is directly sandwiched between the first electrode 113 and the second electrode 111 will emit light after being energized, thus the area occupied by this part corresponds to the light-emitting area of the light-emitting element 11.

For example, the pixel driving circuit 103 generates a light-emitting driving current under the control of the data signal provided by the data driving circuit through the data line DL, the gate scanning signal provided by the shift register through the gate line GL, and the light-emitting control signal, etc. The light-emitting driving current enables the light-emitting element 11 to emit red light, green light, blue light, or white light, etc.

For example, the pixel driving circuit 103 includes a conventional 7T1C (i.e., seven transistors and one capacitor) pixel circuit. The seven transistors include at least one switching transistor and one driving transistor (such as the driving transistor 103 in FIG. 7). The gate electrode of the switching transistor is electrically connected with the shift register unit to receive the signal behind the gate electrode; and the source electrode or drain electrode of the switching transistor is connected with the data line DL to receive the data signal. In different embodiments, the pixel driving circuit 103 may further include a compensation circuit including an internal compensation circuit or an external compensation circuit, and the compensation circuit may include transistors, capacitors, etc. For example, the pixel circuit may also include a reset circuit, a light emission control circuit, a detection circuit, etc. as required. The embodiment of the present disclosure is not intended to limit the type of the first light-emitting device and the specific structure of the pixel circuit.

For example, the material of the pixel defining layer 146 may include organic insulating materials such as polyimide, polyamide, acrylic resin, benzocyclobutene or phenolic resin, or inorganic insulating materials such as silicon oxide and silicon nitride, which are not limited by the embodiments of the present disclosure.

For example, the material of the first electrode 113 may include at least one transparent conductive oxide material, including indium tin oxide (ITO), indium zinc oxide (IZO), zinc oxide (ZnO), and the like. In addition, the first electrode 113 may include a metal with high reflectivity as a reflective layer, e.g., silver (Ag).

For example, for the case of OLED, the light-emitting layer 112 may include a small molecular organic material or a polymer molecular organic material, and may be a fluorescent light-emitting material or a phosphorescent light-emitting material, and may emit red light, green light, blue light or white light. Furthermore, the light-emitting layer may further include functional layers such as an electron injection layer, an electron transport layer, a hole injection layer, a hole transport layer, etc. as required.

For the case of QLED, the light-emitting layer may include quantum dot materials, such as silicon quantum dot, germanium quantum dot, cadmium sulfide quantum dot, cadmium selenide quantum dot, cadmium telluride quantum dot, zinc selenide quantum dot, lead sulfide quantum dot, lead selenide quantum dot, indium phosphide quantum dot and indium arsenide quantum dot, etc., and the particle size of the quantum dot is 2-20 nm.

For example, the second electrode 111 may include various conductive materials. For example, the second electrode 111 may include metal materials such as lithium (Li), aluminum (Al), magnesium (Mg) and silver (Ag).

For example, as shown in FIG. 7, the display substrate 1 further includes an encapsulation layer 147. The encapsulation layer 147 is located at the side of the second electrode 111 away from the base substrate 100. The encapsulation layer 147 seals the light-emitting element 11 (light-emitting element 11), so that the deterioration of the light-emitting element 11 caused by moisture and/or oxygen included in the environment can be reduced or prevented. The encapsulation layer 147 may have a single-layered structure, or a composite-layered structure which includes a structure in which inorganic layer(s) and organic layer(s) are stacked. The encapsulation layer 147 includes at least one encapsulation sublayer. For example, the encapsulation layer 147 may include a first inorganic encapsulation layer, a first organic encapsulation layer, and a second inorganic encapsulation layer which are sequentially arranged.

For example, the material of the encapsulation layer 147 may include insulating materials such as silicon nitride, silicon oxide, silicon oxynitride and polymer resin. The inorganic material such as silicon nitride, silicon oxide and silicon oxynitride has high compactness, which can prevent from the intrusion of water and oxygen. The material of the organic encapsulation layer can be polymer material containing desiccant or polymer material that can block water vapor, for example, polymer resin or the like so as to planarize the surface of the display substrate and to relieve the stress of the first inorganic encapsulation layer and the second inorganic encapsulation layer, and the material of the organic encapsulation layer can also include water-absorbent materials such as desiccant, so as to absorb water, oxygen and other substances invading into the organic encapsulation layer.

For example, as shown in FIG. 7, the display substrate 1 further includes a touch layer 28 located at the side of the encapsulation layer 147 away from the base substrate 100. The touch layer 28 includes at least one touch metal layer and a touch insulating layer 283. The at least one touch metal layer includes a first touch pattern layer 282 and a second touch pattern layer 281. The first touch pattern layer 282 includes a first touch signal line Rx and a second touch signal line Tx which are alternately connected, and the second touch pattern layer 281 is located at the side of the first touch pattern layer 282 close to the base substrate. The touch insulating layer 283 is located between the first touch pattern layer 282 and the second touch pattern layer 281. The second touch pattern layer 281 includes a plurality of first transition parts RL located at the positions where the first touch signal lines Rx and the second touch signal lines Tx intersecting with each other, and the plurality of first transition parts RL are electrically connected to the first touch signal lines Rx through the via holes passing through the touch insulating layer 283. The second touch signal line Tx and the first touch signal line Rx overlap with each other in the direction perpendicular to the substrate surface of the base substrate 100 to form a touch sensor, and the touch sensor is also formed between adjacent second touch signal lines Tx and adjacent first touch signal lines Rx.

For example, in other embodiments, the first touch pattern layer 282 and the second touch pattern layer 281 may include a second touch signal line Tx and a first touch signal line Rx, respectively. The second touch signal line Tx is electrically connected to the first touch signal line Rx through a via hole penetrating through the touch insulating layer 283, and the first touch signal line Rx is continuous, so that there is no need to provide the first transition part RL in such case. The second touch signal line Tx and the first touch signal line Rx overlap with each other in the direction perpendicular to the substrate surface of the base substrate 200 to form a touch sensor, and the touch sensor is also formed between adjacent second touch signal lines Tx and adjacent first touch signal lines Rx.

For example, the first touch pattern layer 282 and the second touch pattern layer 281 are made of transparent conductive materials. For example, the transparent conductive material may be a transparent conductive metal oxide material, such as indium tin oxide (ITO), indium zinc oxide (IZO), zinc oxide (ZnO), aluminum zinc oxide (AZO), indium gallium zinc oxide (IGZO), etc. For example, in other examples, the second touch signal line Tx and the first touch signal line Rx may have a metal mesh structure, for example, the material of the metal mesh may be gold (Au), silver (Ag), copper (Cu), aluminum (Al), molybdenum (Mo), magnesium (Mg), tungsten (W) or alloy materials of the above metals.

For example, in some embodiments, the second detection signal line FML is arranged in the same layer as the first touch pattern layer 282.

For example, in other embodiments, the second detection signal line FML may also be arranged in the same layer as the second touch pattern layer 281.

For example, as shown in FIG. 7, the display substrate 1 further includes a protective layer 284 located at the side of the touch layer 28 away from the base substrate. For example, the material of the protective layer 284 may include insulating materials such as silicon nitride, silicon oxide, silicon oxynitride and polymer resin. The inorganic materials such as silicon nitride, silicon oxide, silicon oxynitride, etc. have high compactness, which can prevent from the intrusion of water, oxygen, etc. The material such as polymer resin can planarize the surface of the display panel and can relieve stress.

For example, in some embodiments, as shown in FIGS. 7 and 8, the second detection signal line FML is arranged in the same layer as the touch metal layer (for example, the first touch pattern layer 282 and/or the second touch pattern layer 281), the first detection signal line BPL is arranged in the same layer as the second display area metal layer 302 (for example, the second electrode plate 132 of the storage capacitor 13), and the first power line VSS is arranged in the same layer as the third display area metal layer 303. Hereinafter, more details will be given with reference to the cross-sectional view along the line B1-B2 in FIG. 6.

For example, in other embodiments, the first detection signal line BPL may also be arranged in the same layer as the third display area metal layer 303. It should be noted that, at the side of the bending area 30 close to the display area, when both the first detection signal line BPL and the first power line VSS are arranged in the same layer as the third display area metal layer 303, the orthographic projection of the first power line on the substrate surface S of the base substrate 100 has no overlap with the orthographic projection of the first detection signal line BPL on the substrate surface S of the base substrate 100. When the first detection signal line BPL is arranged in the same layer as the second display area metal layer 302 and the first power line VSS is arranged in the same layer as the third display area metal layer 303, the edge of the first power line VSS close to the first detection signal line BPL can continue to extend towards the first detection signal line BPL if the the peripheral area 20 of the display substrate 1 has sufficient space, so that the orthographic projection of the first power line VSS on the substrate surface S of the base substrate 100 can cover the area where the orthographic projections of the plurality of first line segments FML3 overlap with the orthographic projection of the first detection signal line BPL (for example, the third line segment BPL3) on the substrate surface S of the base substrate 100.

For example, as shown in FIG. 3 and FIG. 6, the plurality of signal lines CL may include at least one metal layer, for example, each of the plurality of signal lines CL includes two metal layers spaced apart from each other, for example, one of the two metal layers is arranged in the same layer as the first display area metal layer 301, and the other of the two metal layers is arranged in the same layer as the second display area metal layer 302. For example, the two metal layers are spaced apart and insulated by a second insulating layer 1243.

For example, the plurality of signal lines CL also extend to the bending area 30, respectively, and are connected with corresponding leads 3001 in the bending area 30. At least one metal layer in the lead 3001 is arranged in the same layer as the fourth display area metal layer 304. For example, the metal layer in the plurality of signal lines CL that is arranged in the same layer as the second display area metal layer 302 is connected to the lead 3001 through a via hole, and the via hole penetrates through multiple insulating layers that are arranged in the same layer as the interlayer insulating layer 1244, the first planarization layer 1245 and the passivation layer 1246.

For example, the first power line VSS also extends to the bending area 30, and is connected with the corresponding lead 3001 in the bending area 30. At least one metal layer in the lead 3001 is arranged in the same layer as the fourth display area metal layer 304. For example, the metal layer in the first power line VSS that is arranged in the same layer as the second display area metal layer 302 is connected to the lead 3001 through a via hole, and the via hole penetrates through multiple insulating layers that are arranged in the same layer as the first planarization layer 1245 and the passivation layer 1246.

It should be noted that, in the embodiment of the present disclosure, "arranged in the same layer" includes the case where two functional layers or structural layers are in the same layer of the hierarchical structure of the display substrate and are formed of the same material; that is, in the preparation process, the two functional layers or structural layers can be formed from the one and same material layer, and the required pattern(s) and structure(s) can be formed by the one and same patterning process. A single patterning process includes, for example, process steps of forming a photoresist, exposing, developing and etching.

For example, as shown in FIG. 8, at the first side S1 of the display area 10, the display substrate 1 includes a first peripheral insulating layer 2244 and a second peripheral insulating layer 2245. The first detection signal line BPL is located at the side of the first peripheral insulating layer 2244 close to the base substrate 100, the second peripheral insulating layer 2245 is located at the side of the first peripheral insulating layer 2244 away from the base substrate 100, and the second detection signal line FML is located at the side of the second peripheral insulating layer 2245 away from the base substrate 100. The first peripheral insulating layer 2244 is arranged in the same layer as the interlayer insulating layer 1244, and the second peripheral insulating layer 2245 is arranged in the same layer as the first planarization layer 1245. The second via hole GK1 penetrates through at least the first peripheral insulating layer 2244 and the second peripheral insulating layer 2245. The second end BPL2 of the first detection signal line BPL and the second end FML2 of the second detection signal line FML are connected in series through the second via hole GK1.

For example, as shown in FIG. 8, the second via hole GK1 includes a first sub-via hole GK11 and a second sub-via hole GK12. The display substrate 1 further includes a peripheral passivation layer 2246, a third peripheral insulating layer 2251, a fourth peripheral insulating layer 2283, a second transition electrode ZL1, and a third transition electrode ZL2. The peripheral passivation layer 2246 is arranged between the first peripheral insulating layer 2244 and the second peripheral insulating layer 2245, and is arranged in the same layer as the passivation layer 1246. The third peripheral insulating layer 2251 is arranged at the side of the second peripheral insulating layer 2245 away from the base substrate 100. The second transition electrode ZL1 and the third transition electrode ZL2 are located between the third peripheral insulating layer 2251 and the second peripheral insulating layer 2245, and are arranged in the same layer as the first transition electrode 241. The fourth peripheral insulating layer 2283 is arranged at the side of the second transition electrode ZL1 and the third transition electrode ZL2 away from the base substrate 100. The second detection signal line FML is located at the side of the fourth peripheral insulating layer 2283 away from the base substrate. The first sub-via hole GK11 penetrates through the first peripheral insulating layer 2244, the peripheral passivation layer 2246 and the second peripheral insulating layer 2245, and is configured to expose the second end BPL2 of the first detection signal line BPL. The second via hole GK12 penetrates through the third peripheral insulating layer 2251 and the fourth peripheral insulating layer 2283, and is configured to expose the second transition electrode ZL1. The second transition electrode ZL1 is connected to the second end BPL2 of the first detection signal line BPL through the first sub-via hole GK11, and part of the second end FML2 of the second detection signal line FML is connected to the second transition electrode ZL1 through the second sub-via hole GK12, so as to realize the series connection between the second end FML2 of the second detection signal line FML and the second end BPL2 of the first detection signal line BPL. The second transition electrode ZL1 can avoid directly forming a through via hole with a relatively large aperture in the insulating layer between the first detection signal line BPL and the second detection signal line FML, thereby improving the quality of the electrical connection through via hole.

For example, as shown in FIG. 8, in the direction perpendicular to the substrate surface S of the base substrate 100, the insulating layer in the same layer as the pixel defining layer 1461 is not provided between the second end BPL2 of the first detection signal line BPL and the second end FML2 of the second detection signal line FML, so as to reduce the film thickness and improve the connection quality between the first detection signal line BPL and the second detection signal line FML.

For example, as shown in FIG. 8, the sub-via hole GK21 of the third via hole GK2 penetrates through the third peripheral insulating layer 2251 and the fourth peripheral insulating layer 2283, and is configured to expose the second transition electrode ZL1. The second end FML2 of the second detection signal line FML is connected to the second transition electrode ZL1 through the sub-via hole GK21 of the third via hole GK2. For example, the second transition electrode ZL1 may be arranged in the same layer as one metal layer of the lead 3001 of the bending area 30, for example, the metal layer arranged in the same layer as the fourth display area metal layer 304; alternatively, the second transition electrode ZL1 may be located in a layer different from that of the lead 3001 of the bending area 30, and is connected to the lead 3001 of the bending area 30 through other sub-via holes of the third via hole GK2. The sub-via hole GK31 of the fourth via hole GK3 penetrates through the third peripheral insulating layer 2251 and the fourth peripheral insulating layer 2283, and is configured to expose the third transition electrode ZL2. The first end FML1 of the second detection signal line FML is connected to the third transition electrode ZL2 through the sub-via hole GK31 of the fourth via hole GK3. For example, the third transition electrode ZL2 may be arranged in the same layer as one metal layer of the lead 3001 of the bending area 30, for example, the metal layer arranged in the same layer as the fourth display area metal layer 304; alternatively, the third transition electrode ZL2 may be located in a layer different from that of the lead 3001 of the bending area 30, and is connected to the lead 3001 of the bending area 30 through other sub-via holes of the fourth via hole GK3.

For example, as shown in FIG. 8, the embodiment in which the second transition electrode ZL1 and the third transition electrode ZL2 are arranged in the same layer as the fourth display area metal layer 304 is illustrated by way of example.

It should be noted that, in the embodiment of the present disclosure, metal layers (for example, including the second transition electrode ZL1 and the third transition electrode ZL2) that are arranged in the same layer as the first transition electrode 241 are provided in an area of the orthographic projections of the first end FML1 and the second end FML2 of the second detection signal line FML on the substrate surface S of the base substrate 100, so as to improve the connection quality of the second detection signal line FML.

For example, in some embodiments, as shown in FIG. 6, the first end BPL1 of the first detection signal line BPL is connected with the corresponding lead 3001 in the bending area 30. At least one metal layer in the lead 3001 is arranged in the same layer as the fourth display area metal layer 304. For example, when the first detection signal line BPL is arranged in the same layer as the second display area metal layer 302, the first end BPL1 of the first detection signal line BPL is connected to the lead 3001 through a via hole penetrating through the second peripheral insulating layer 2245, the first peripheral insulating layer 2244 and the peripheral passivation layer 2246.

For example, in some embodiments, as shown in FIG. 6, the display substrate 1 further includes a third detection signal line BPL5. The first end BPL51 and the second end BPL52 of the third detection signal line BPL5 are led out from the bending area 30. For example, the first end BPL51 and the second end BPL52 of the third detection signal line BPL5 are connected to the leads 3001 in the bending area 30, respectively. The third detection signal line BPL5 is arranged at the side where the first detection signal line BPL and the shift register GOA are located (for example, the second side S2 and the third side S3 of the display area), and the fourth side S4 opposite to the first side S1 of the display area 10, that is, the third detection signal line BPL5 is routed around the display area 10. The third detection signal line BPL5 is not connected to the second detection signal line FML, and independently detects the PCD signal indicating that the TFT layer metal of the display substrate has cracks. The third detection signal line BPL5 is located at the side of the first end FML1 of the second detection signal line FML away from the second end FML2 of the second detection signal line FML, that is, located between the plurality of signal lines CL and the first end FML1 of the second detection signal line FML.

For example, as shown in FIG. 6, the wiring layout of the third detection signal line BPL5 has a shape approximately the same as that of the first detection signal line BPL. For example, the third detection signal line BPL5 further includes a fifth line segment BPL53 connected to the first end BPL51 and a fifth line segment BPL54 connected to the second end BPL2. The fifth line segments BPL53 and BPL54 are parallel (e.g., approximately parallel) to the fourth line segments BPL41 and BPL42. Therefore, the wiring space is saved.

For example, as shown in FIG. 5, for example, the third detection signal line BPL5 further includes a sixth line segment BPL55 connected to the fifth line segment BPL53 and a sixth line segment BPL56 connected to the fifth line segment BPL54. The sixth line segment BPL55 and the fifth line segment BPL54 are parallel (for example, approximately parallel) to the third line segment BPL31 and the third line segment BPL32. The sixth line segment BPL55 and the fifth line segment BPL54 are located between the third line segment BPL32 and the plurality of signal lines CL. Therefore, the wiring space is saved.

For example, as shown in FIG. 6, a bending occurs between the second line segment FML42 and the first broken line segment FML52 of the second detection signal line FML. The corner C1 at the junction of the second line segment FML42 and the first broken line segment FML52 is an obtuse angle. For example, the value range of the corner C1 is, for example, greater than 90°, for example, about 110°. A bending occurs between the second line segment FML41 and the first broken line segment FML51 of the second detection signal line FML. The corner C2 at the junction of the second line segment FML41 and the first broken line segment FML51 is an obtuse angle. For example, the value range of the corner C2 is, for example, greater than 90°, for example, about 110°. A bending occurs between the fourth line segment BPL41 and the third line segment BPL31 of the first detection signal line BPL. The corner C3 at the junction of the fourth line segment BPL41 and the third line segment BPL31 is an obtuse angle. For example, the value range of the corner C3 is, for example, greater than 90°, for example, about 110°. For example, the corner at the junction of the fourth line segment BPL42 and the third line segment BPL32 of the first detection signal line BPL may have the same size as that of the corner C3, which will not be described in detail here. Therefore, the wiring space is reduced.

For example, as shown in FIG. 6, the width H1 of the corner C1 formed at the junction of the second line segment FML42 and the first broken line segment FML52 is, for example, in the value range of 32-40 microns, for example, about 36 microns. For example, the width H2 of the corner C2 formed at the junction of the second line segment FML41 and the first broken line segment FML51 is, for example, in the value range of 32-40 microns, for example, about 36 microns. For example, the distance H3 between the corner C1 and the corner C2 is in the value range of 40-60 microns, for example, about 50 microns. For example, the distance H4 between the second line segment FML42 and the second line segment FML41 is in the value range of, for example, 15-20 microns, for example, about 18 microns. Therefore, the wiring space is reduced.

For example, in other embodiments, in the area where the orthographic projection of the first power line VSS on the substrate surface S of the base substrate 100 is located, the second detection signal line FML and the first detection signal line BPL can be routed to be intersected with the plurality of signal lines CL, so as to reduce the wiring space; and the first power line VSS can play the role of signal shielding and reduce the interference among various lines. For example, as shown in FIG. 4, for example, the first detection signal line BPL is routed in parallel with the plurality of signal lines CL. The second detection signal line FML and the first detection signal line BPL may cross over the plurality of signal lines CL outside the area where the orthographic projection of the first power line VSS on the substrate surface S of the base substrate 100 is located.

For example, as shown in FIG. 5, the plurality of third line segments BPL3 of the first detection signal line BPL are routed in parallel; and the spacing of the plurality of third line segments BPL3 in the direction perpendicular to the routing direction is, for example, greater than or equal to 1 micron, for example, about 1 micron, so as to reduce the interference between signals or avoid the generation of parasitic capacitance.

For example, as shown in FIG. 8, the display substrate 1 further includes a peripheral barrier layer 2240, a peripheral buffer layer 2241, a first peripheral gate insulating layer 2242, a second peripheral gate insulating layer 2243, and a peripheral protective layer 2284. The peripheral barrier layer 2240 is arranged on the base substrate 100 and is arranged in the same layer as the barrier layer 1240. The peripheral buffer layer 2241 is arranged at the side of the peripheral barrier layer 2240 away from the base substrate 100, and is arranged in the same layer as the buffer layer 1241. The first peripheral gate insulating layer 2242 is arranged at the side of the peripheral buffer layer 2241 away from the base substrate 100, and is arranged in the same layer as the first insulating layer 1242. The second peripheral gate insulating layer 2243 is arranged at the side of the first peripheral gate insulating layer 2242 away from the base substrate 100, and is arranged in the same layer as the second insulating layer 1243. The peripheral protective layer 2284 is arranged at the side of the second detection signal line FML away from the base substrate 100, and is arranged in the same layer as the protective layer 284. Therefore, the preparation process is simplified.

Figure 9:
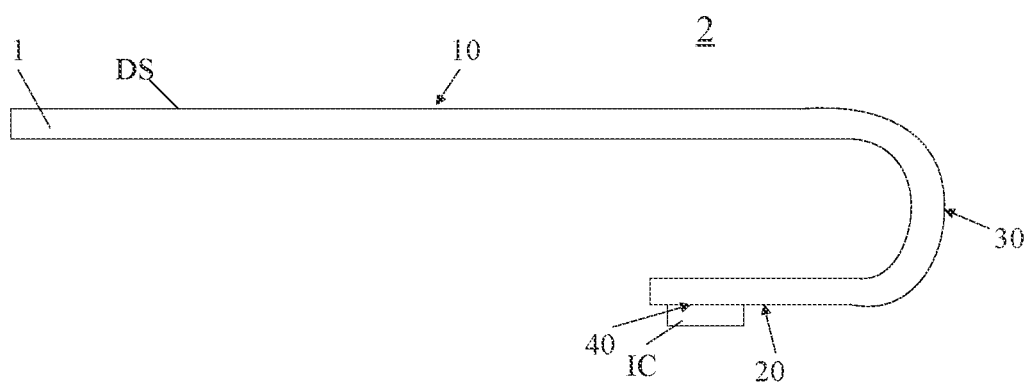
FIG. 9 is a schematic diagram of a display device provided by at least one embodiment of the present disclosure.

FIG. 9 is a schematic diagram of a display device provided by at least one embodiment of the present disclosure.

At least one embodiment of the present disclosure also provides a display device. FIG. 9 is a schematic diagram of a display device according to an embodiment of the present disclosure. As shown in FIG. 9, the display device 2 includes a display substrate 1 provided by any embodiment of the present disclosure and a signal input element. For example, the display substrate 1 shown in FIG. 1 is used as the display substrate 1.

As shown in FIG. 9, the portion of the display substrate 1 located in the peripheral area 20 is bent onto the back side of the portion DS of the display substrate 1 located in the display area 10. For example, the back side refers to the operation side of the display substrate 1 (or the opposite side where the plurality of sub-pixels P111 are provided). When the base substrate 100 adopts a flexible base substrate, the bending operation of the bending area 30 of the display substrate 1 is facilitated. The display device 2 formed by the bending process has a narrow bezel. For example, the signal input element includes a data driving circuit IC. For example, the data driving circuit IC can be bonded with the bonding area 40 of the display substrate 1. The data driving circuit IC provides the display signal of the display substrate 1 in the display stage, so that the sub-pixels P111 display an image.

It should be noted that the display device 2 can be any product or component with display function such as OLED panel, OLED TV, QLED panel, QLED TV, mobile phone, tablet computer, notebook computer, digital photo frame, navigator, etc. The display device 2 may also include other components, such as a data driving circuit, a timing controller, etc., and the embodiment of the present disclosure is not limited to this.

It should be noted that, for clarity and conciseness, the embodiments of the present disclosure do not show all the constituent units of the display device. In order to realize the basic substrate function(s) of the display device, those skilled in the art can provide and configure other structures not shown according to specific needs, and the embodiments of the present disclosure are not limited to this.

For the technical effects of the display device 2 provided in the above embodiments, please refer to the technical effects of the display substrate 1 provided in the embodiments of the present disclosure, which will not be repeated here.

The following points need to be explained:
(1) The drawings of the embodiments of the present disclosure only refer to the structures related to the embodiments of the present disclosure, and other structures can refer to the general design.
(2) Without conflict, the embodiments of the present disclosure and the features in the embodiments can be combined with each other to obtain new embodiment(s).

The above are only the specific embodiments of the present disclosure, but the scope of protection of the present disclosure is not limited to this. Any person familiar with this technical field can easily conceive of changes or substitutions within the technical scope disclosed in the present disclosure, which should be fallen within the scope of protection of the present disclosure. Therefore, the scope of protection of the present disclosure should be based on the scope of protection of the claims.

What is claimed is:

1. A display substrate, comprising:
a base substrate comprising a display area and a peripheral area surrounding the display area, wherein the display area comprises a pixel array comprising a plurality of sub-pixels, and wherein the peripheral area comprises a bending area located at a first side of the display area, and a shift register located at at least one of a second side or a third side of the display area, the first side is adjacent to the second side and the third side,
a plurality of signal lines, wherein one end of each of the plurality of signal lines is led out from the bending area, and the other end of each of the plurality of signal lines is connected with the shift register,
a first power line led out from the bending area and routed around the display area,
at least one first detection signal line arranged at at least one of a side where the shift register is located or a fourth side opposite to the first side of the display area, wherein a first end of the at least one first detection signal line is led out from the bending area, and at least one second detection signal line arranged at at least one of the side where the shift register is located or the fourth side, wherein a first end of the at least one second detection signal line is led out from the bending area, wherein at a side close to the bending area and outside an area where an orthographic projection of the first power line on a substrate surface of the base substrate is located, an orthographic projection of the at least one first detection signal line on the substrate surface of the base substrate has no overlap with orthographic projections of the plurality of signal lines on the substrate surface of the base substrate, and an orthographic projection of the at least one second detection signal line on the substrate surface of the base substrate has no overlap with the orthographic projections of the plurality of signal lines on the substrate surface of the base substrate.

2. The display substrate according to claim 1, wherein at the first side of the display area, in the area where the orthographic projection of the first power line on the substrate surface of the base substrate is located, the orthographic projection of the at least one second detection signal line on the substrate surface of the base substrate overlaps with the orthographic projections of the plurality of signal lines on the substrate surface of the base substrate.

3. The display substrate according to claim 2, wherein an area where the orthographic projection of the at least one second detection signal line on the substrate surface of the base substrate overlaps with the orthographic projections of the plurality of signal lines on the substrate surface of the base substrate is completely covered by the area where the orthographic projection of the first power line on the substrate surface of the base substrate is located.

4. The display substrate according to claim 1, wherein at the first side of the display area, a second end of the at least one first detection signal line is connected in series with a second end of the at least one second detection signal line.

5. The display substrate according to claim 1, wherein at the first side of the display area and in a direction perpendicular to the substrate surface of the base substrate, at least part of a film layer where the first power line is located is located between a film layer where the at least one second detection signal line is located and a film layer where the plurality of signal lines are located.

6. The display substrate according to claim 1, wherein
at the side close to the bending area and outside the area where the orthographic projection of the first power line on the substrate surface of the base substrate is located, the plurality of signal lines are routed in parallel,
at least some of line segments of the at least one first detection signal line and at least some of line segments of the at least one second detection signal line are routed in parallel to the plurality of signal lines, and the at least one second detection signal line is located at a side of the at least one first detection signal line away from the plurality of signal lines.

7. The display substrate according to claim 1, wherein
at the first side of the display area, the at least one second detection signal line comprises a plurality of first line segments respectively connected to the first end and a second end of the at least one second detection signal line, and the plurality of first line segments extend along a first direction,
in the area where the orthographic projection of the first power line on the substrate surface of the base substrate is located, orthographic projections of the plurality of first line segments on the substrate surface of the base substrate overlap with the orthographic projections of the plurality of signal lines on the substrate surface of the base substrate.

8. The display substrate according to claim 7, wherein
an area where the orthographic projections of the plurality of first line segments on the substrate surface of the base substrate overlap with the orthographic projections of the plurality of signal lines on the substrate surface of the base substrate has a length in the first direction ranging from 220 microns to 260 microns.

9. The display substrate according to claim 7, wherein
at the side close to the bending area and outside the area where the orthographic projection of the first power line on the substrate surface of the base substrate is located, the orthographic projections of the plurality of first line segments on the substrate surface of the base substrate also overlap with the orthographic projection of the at least one first detection signal line on the substrate surface of the base substrate.

10. The display substrate according to claim 7, wherein
the at least one second detection signal line further comprises a plurality of second line segments, wherein one of the plurality of first line segments is connected with the first end of the at least one second detection signal line through one of the plurality of second line segments, another one of the plurality of first line segments is connected with the second end of the at least one second detection signal line through another one of the plurality of second line segments, and the plurality of second line segments are located between the plurality of first line segments and the bending area, wherein the plurality of second line segments are routed along a direction intersecting with the first direction,
the at least one first detection signal line comprises a plurality of third line segments respectively connected with the first end and the second end of the at least one first detection signal line, orthographic projections of the plurality of third line segments on the substrate surface of the base substrate overlap with the orthographic projections of the plurality of first line segments on the substrate surface of the base substrate, and the plurality of third line segments are routed and arranged in parallel with the plurality of second line segments,
the plurality of third line segments are located at a side of the plurality of second line segments close to the display area, and are located between the plurality of second line segments and the plurality of signal lines.

11. The display substrate according to claim 10, wherein
in a routing direction perpendicular to the plurality of second line segments and the plurality of third line segments, the plurality of second line segments and the plurality of third line segments are routed in parallel with line segments of the plurality of signal lines corresponding to the second line segments and the third line segments.

12. The display substrate according to claim 11, wherein
the second line segment connected to the first end of the at least one second detection signal line is adjacent to the third line segment connected to the first end of the at least one first detection signal line, and
in the routing direction perpendicular to the plurality of second line segments and the plurality of third line segments, an interval width between the second line segment and the third line segment that are adjacent is in the range from 2 microns to 3 microns.

13. The display substrate according to claim 10, wherein at a side of the bending area close to the display area, a position where the second end of the at least one first detection signal line and the second end of the at least one second detection signal line are connected in series is located between the first end of the at least one second detection signal line and the first end of the at least one first detection signal line,
the first end of the at least one first detection signal line is located at a side of the first end of the at least one second detection signal line away from the plurality of signal lines.

14. The display substrate according to claim 10, wherein the at least one second detection signal line further comprises a plurality of first broken line segments parallel to each other, one of the plurality of first broken line segments is connected with one of the plurality of second line segments and the first end of the at least one second detection signal line, another one of the plurality of first broken line segments is connected with another one of the plurality of second line segments and the second end of the at least one second detection signal line,
a line width of the plurality of first broken line segments is greater than that of the plurality of second line segments.

15. The display substrate according to claim 14, wherein at least some line segments of the plurality of first broken line segments are routed in a second direction different from the first direction.

16. The display substrate according to claim 14- or 15, wherein
the at least one first detection signal line further comprises a plurality of fourth line segments, and the plurality of fourth line segments are routed along the first direction, one of the plurality of third line segments is connected to the first end of the at least one first detection signal line through one of the plurality of fourth line segments, another one of the plurality of third line segments is connected to the second end of the at least one first detection signal line through another one of the plurality of fourth line segments,
orthographic projections of the plurality of fourth line segments on the substrate surface of the base substrate respectively overlap with an orthographic projection of at least one of the plurality of first broken line segments on the substrate surface of the base substrate.

17. The display substrate according to claim 1, wherein the sub-pixel comprises a pixel structure comprising a pixel driving circuit, a first planarization layer, and a light-emitting element,
wherein the pixel driving circuit comprises a first display area metal layer, a second display area metal layer, a third display area metal layer, a first insulating layer, a second insulating layer, an interlayer insulating layer, the first planarization layer and a pixel defining layer, wherein the first planarization layer is at a side of the pixel driving circuit away from the base substrate to provide a first planarization surface, and the first planarization layer comprises a first via hole,
the light-emitting element comprises a first electrode, a second electrode and a light-emitting layer located between the first electrode and the second electrode, wherein the first electrode is located at a side of the first planarization layer away from the base substrate, the first electrode is electrically connected with the third display area metal layer of the pixel driving circuit through the first via hole, the pixel defining layer is located at a side of the first electrode away from the base substrate, and the pixel defining layer defines a light-emitting area of the light-emitting element,
the first insulating layer is located on the base substrate, the first display area metal layer is located at a side of the first insulating layer away from the base substrate, the second insulating layer is located at a side of the first display area metal layer away from the base substrate, the second display area metal layer is located at a side of the second insulating layer away from the base substrate, the interlayer insulating layer is located between the first planarization layer and the second insulating layer, and the third display area metal layer is located at a side of the interlayer insulating layer away from the base substrate,
the display substrate further comprises an encapsulation layer and a touch metal layer, wherein the encapsulation layer is located at a side of the light-emitting element away from the base substrate, and the touch metal layer is located at a side of the encapsulation layer away from the base substrate,
wherein the at least one second detection signal line is arranged at least in the same layer as the touch metal layer, the at least one first detection signal line is arranged at least in the same layer as the second display area metal layer, and the first power line is arranged at least in the same layer as the third display area metal layer.

18. The display substrate according to claim 17, further comprising a second via hole, a first peripheral insulating layer and a second peripheral insulating layer, wherein
the at least one first detection signal line is located at a side of the first peripheral insulating layer close to the base substrate, the second peripheral insulating layer is located at a side of the first peripheral insulating layer away from the base substrate, and the at least one second detection signal line is located at a side of the second peripheral insulating layer away from the base substrate,
the first peripheral insulating layer is arranged in the same layer as the interlayer insulating layer, the second peripheral insulating layer is arranged in the same layer as the first planarization layer,
the second via hole penetrates through at least the first peripheral insulating layer and the second peripheral insulating layer, and the second end of the at least one first detection signal line and the second end of the at least one second detection signal line are connected in series through the second via hole, and
in a direction perpendicular to the substrate surface of the base substrate, an insulating layer arranged in the same layer as the pixel defining layer at least is not provided between the second end of the at least one first detection signal line and the second end of the at least one second detection signal line.

19. The display substrate according to claim 1, wherein at the side of the display substrate where the shift register is located, the at least one first detection signal line and the at least one second detection signal line are located at a side of the shift register away from the display area.

20. A display device comprising the display substrate according to claim 1.

* * * * *